(12) United States Patent
Mentzer et al.

(10) Patent No.: US 8,362,436 B1
(45) Date of Patent: Jan. 29, 2013

(54) ELECTRO-OPTIC FLUID QUANTITY MEASUREMENT SYSTEM

(75) Inventors: Mark A. Mentzer, Lititz, PA (US); Nicholas P. Petrillo, New Cumberland, PA (US); Wayne A. Webb, Lancaster, PA (US)

(73) Assignee: Advanced Precision Inc., Mechanicsburg, PA (US)

( * ) Notice: Subject to any disclaimer, the term of this patent is extended or adjusted under 35 U.S.C. 154(b) by 653 days.

(21) Appl. No.: 11/686,254

(22) Filed: Mar. 14, 2007

Related U.S. Application Data

(60) Provisional application No. 60/782,587, filed on Mar. 14, 2006.

(51) Int. Cl.
*G01T 1/20* (2006.01)
*G01F 23/00* (2006.01)

(52) U.S. Cl. .................. 250/363.01; 250/357.1

(58) Field of Classification Search ............... 250/357.1, 250/363.01
See application file for complete search history.

(56) References Cited

U.S. PATENT DOCUMENTS

| | | |
|---|---|---|
| 3,120,125 A | 2/1964 | Vasel |
| 4,032,817 A | 6/1977 | Richmond |
| 4,119,860 A | 10/1978 | Gooley |
| 4,201,471 A | 5/1980 | Pitt et al. |
| 4,234,820 A | 11/1980 | Widmayer |
| 4,284,884 A | 8/1981 | Dyment et al. |
| 4,355,238 A | 10/1982 | Ruell |
| 4,450,722 A | 5/1984 | Keyes et al. |
| 4,516,432 A | 5/1985 | Hironaga et al. |
| 4,521,683 A | 6/1985 | Miller |
| 4,564,292 A | 1/1986 | Omet |
| 4,627,284 A | 12/1986 | Gersh et al. |
| 4,650,992 A | 3/1987 | Ruhrmann |
| 4,711,126 A | 12/1987 | Houpt et al. |
| 4,727,247 A | 2/1988 | Johnston |
| 4,745,293 A | 5/1988 | Christensen |
| 4,785,814 A | 11/1988 | Kane |
| 4,800,886 A | 1/1989 | Nestor |
| 4,821,570 A | 4/1989 | Khoi |
| 4,852,054 A * | 7/1989 | Mastandrea .................. 702/51 |
| 4,870,292 A | 9/1989 | Alpert et al. |
| 4,880,971 A | 11/1989 | Danisch |
| 4,936,681 A | 6/1990 | Ruhrmann |
| 4,942,306 A | 7/1990 | Colbourne |
| 4,994,382 A | 2/1991 | Ameyama et al. |
| 4,998,043 A | 3/1991 | Unami et al. |

(Continued)

FOREIGN PATENT DOCUMENTS

| | | |
|---|---|---|
| GB | 2336668 | 10/1999 |
| GB | 2336668 A | 10/1999 |

(Continued)

OTHER PUBLICATIONS

U.S. Appl. No. 11/649,142 entitled "Systems and Methods for Generating Optical Energy Using a Light-Emitting Diode" filed Jan. 3, 2007.

(Continued)

*Primary Examiner* — David Porta
*Assistant Examiner* — Carolyn Igyarto
(74) *Attorney, Agent, or Firm* — Smith, Gambrell & Russell, LLP

(57) ABSTRACT

Systems and methods determine the level, density, and/or temperature of a fluid based on the fluorescence of a material within an optical waveguide slab at least partially immersed in the fluid.

35 Claims, 27 Drawing Sheets

U.S. PATENT DOCUMENTS

| | | | |
|---|---|---|---|
| 5,055,699 A * | 10/1991 | Konig et al. | 250/577 |
| 5,115,811 A | 5/1992 | Hartlaub et al. | |
| 5,152,287 A | 10/1992 | Kane | |
| 5,164,608 A | 11/1992 | Vali et al. | |
| 5,193,544 A | 3/1993 | Jaffe | |
| 5,229,596 A | 7/1993 | Ujihara | |
| 5,279,793 A | 1/1994 | Glass | |
| 5,311,274 A * | 5/1994 | Cole, Jr. | 356/133 |
| 5,345,167 A | 9/1994 | Hasegawa et al. | |
| H1364 H | 10/1994 | Toeppen | |
| 5,646,354 A | 7/1997 | Lovejoy | |
| 5,804,831 A | 9/1998 | Romatzick | |
| 6,016,191 A | 1/2000 | Ramos et al. | |
| 6,097,159 A | 8/2000 | Mogi et al. | |
| 6,172,377 B1 | 1/2001 | Weiss | |
| 6,303,916 B1 | 10/2001 | Gladnick | |
| 6,398,382 B1 | 6/2002 | Boyce et al. | |
| 6,407,383 B1 | 6/2002 | Byatt et al. | |
| 6,441,558 B1 | 8/2002 | Muthu et al. | |
| 6,624,892 B1 | 9/2003 | Johnston | |
| 6,649,896 B2 | 11/2003 | Birrer et al. | |
| 6,650,799 B2 | 11/2003 | Lyons | |
| 6,720,544 B2 | 4/2004 | Barna et al. | |
| 6,801,678 B2 | 10/2004 | Murshid | |
| 6,831,290 B2 | 12/2004 | Mentzer | |
| 6,888,636 B2 | 5/2005 | Martino et al. | |
| 6,891,142 B2 | 5/2005 | Ogawa | |
| 6,970,247 B2 | 11/2005 | Yankielun | |
| 7,058,244 B2 | 6/2006 | Iida et al. | |
| 7,157,681 B1 | 1/2007 | Tetzlaff | |
| 7,240,730 B2 * | 7/2007 | Williams et al. | 166/250.03 |
| 7,276,863 B2 | 10/2007 | Lee et al. | |
| 7,573,565 B1 | 8/2009 | Mentzer et al. | |
| 7,671,539 B1 | 3/2010 | Mentzer et al. | |
| 7,710,567 B1 | 5/2010 | Mentzer et al. | |
| 7,768,646 B1 | 8/2010 | Mentzer et al. | |
| 2002/0054288 A1 | 5/2002 | Kim et al. | |
| 2003/0076056 A1 | 4/2003 | Schuurmans | |
| 2003/0172752 A1 | 9/2003 | Kluth et al. | |
| 2004/0036043 A1 | 2/2004 | Murshid | |
| 2005/0040773 A1 | 2/2005 | Lebens et al. | |
| 2005/0172700 A1 * | 8/2005 | Sugiura | 73/61.48 |

FOREIGN PATENT DOCUMENTS

JP 03215711 A 9/1991

OTHER PUBLICATIONS

El-Baradie et al., Optical Selection of the preferred solvent of a standard polymer for laser light scattering phenomena investigations, *Physica B* 292 (Feb. 2, 2000), pp. 208-212.

U.S. Appl. No. 11/670,157 to Mentzer et al. filed Feb. 1, 2007 (all pages).

Simpson, J.O. et al., "Fundamental Insight on Developing Low Dielectric Constant Polymides", *NASA Langley Research Center*, Hampton, VA 23681-0001, 19 pages (1997).

Coordinating Research Council, Inc., "Handbook of Aviation Fuel Properties", CRC Report No. 635, (2004), pp. i-4-18.

Hunsperger, Robert G., "Integrated Optics Theory and Technology: Second Edition", *Springer-Verlag*, (Second Printing 1985), pp. 31-63.

Weiss, Johnathan D., "Fluorescent optical liquid-level sensor", *Opt. Eng.* 39(8), (Aug. 2000) pp. 2198-2213.

"Agilent Technologies Application Brief, 1-007," Projection of Long Term Light Output Performance for AS AlinGaP LED Technology, 1999, 2 pages, Date: No. 1999.

Meyrath, T.P., Multipurpose Analog PID Controller, Todd P. Meyrath, Atom Optics Laboratory Center for Nonlinear Dynamics, University of Texas at Austin, Mar. 14, 2000, 1-6.

* cited by examiner

FIG. 23A

| Weight of Fuel in Tank | Level of fuel in Tank | Dry to full Volts | Initial FE Volts | Vout EF_1 Volts | Vout FE_1 Volts | Vout EF_2 Volts | Vout FE_2 Volts | Vout EF_3 Volts | Vout FE_3 Volts | Vout EF_4 Volts | Vout FE_4 Volts | Average Volts | Standard Deviation |
|---|---|---|---|---|---|---|---|---|---|---|---|---|---|
| 0.000 | 0.0 | 8.387 | 8.387 | 7.662 | 7.243 | 7.286 | 7.440 | 7.541 | 7.289 | 7.310 | 7.500 | 7.603 | 0.430 |
| 0.088 | 0.2 | 6.709 | 6.590 | 6.364 | 5.850 | 6.202 | 6.144 | 6.455 | 6.011 | 6.174 | 6.200 | 6.270 | 0.262 |
| 0.200 | 0.4 | 5.553 | 5.472 | 5.266 | 4.940 | 5.157 | 5.133 | 5.213 | 5.015 | 5.148 | 5.170 | 5.207 | 0.187 |
| 0.310 | 0.6 | 4.185 | 4.123 | 4.250 | 3.873 | 4.303 | 4.128 | 4.231 | 4.070 | 4.244 | 4.151 | 4.156 | 0.122 |
| 0.438 | 0.8 | 3.445 | 3.466 | 3.522 | 3.415 | 3.536 | 3.510 | 3.520 | 3.477 | 3.533 | 3.520 | 3.494 | 0.041 |
| 0.564 | 1.0 | 3.270 | 3.264 | 3.309 | 3.260 | 3.313 | 3.308 | 3.308 | 3.288 | 3.314 | 3.318 | 3.295 | 0.023 |
| 0.648 | 1.2 | 3.188 | 3.187 | 3.220 | 3.190 | 3.222 | 3.225 | 3.243 | 3.211 | 3.222 | 3.234 | 3.214 | 0.020 |
| 0.786 | 1.4 | 3.118 | 3.113 | 3.153 | 3.122 | 3.157 | 3.159 | 3.158 | 3.145 | 3.159 | 3.167 | 3.145 | 0.020 |
| 0.900 | 1.6 | 3.053 | 3.049 | 3.092 | 3.073 | 3.099 | 3.103 | 3.098 | 3.092 | 3.104 | 3.111 | 3.087 | 0.022 |
| 1.020 | 1.8 | 2.997 | 2.994 | 3.037 | 3.020 | 3.045 | 3.053 | 3.045 | 3.039 | 3.049 | 3.057 | 3.034 | 0.022 |
| 1.138 | 2.0 | 2.946 | 2.937 | 2.984 | 2.968 | 2.994 | 3.000 | 2.994 | 2.989 | 2.997 | 3.007 | 2.982 | 0.024 |
| 1.256 | 2.2 | 2.901 | 2.887 | 2.934 | 2.919 | 2.944 | 2.956 | 2.944 | 2.943 | 2.950 | 2.956 | 2.933 | 0.024 |
| 1.370 | 2.4 | 2.854 | 2.848 | 2.890 | 2.876 | 2.897 | 2.912 | 2.899 | 2.897 | 2.902 | 2.912 | 2.889 | 0.022 |
| 1.494 | 2.6 | 2.804 | 2.800 | 2.840 | 2.823 | 2.846 | 2.866 | 2.850 | 2.847 | 2.853 | 2.859 | 2.839 | 0.023 |
| 1.604 | 2.8 | 2.757 | 2.753 | 2.791 | 2.779 | 2.799 | 2.814 | 2.802 | 2.802 | 2.806 | 2.808 | 2.791 | 0.021 |
| 1.728 | 3.0 | 2.706 | 2.706 | 2.737 | 2.726 | 2.746 | 2.769 | 2.752 | 2.750 | 2.757 | 2.760 | 2.741 | 0.022 |
| 1.836 | 3.2 | 2.660 | 2.668 | 2.678 | 2.692 | 2.702 | 2.728 | 2.705 | 2.708 | 2.711 | 2.716 | 2.697 | 0.022 |
| 1.952 | 3.4 | 2.614 | 2.620 | 2.632 | 2.651 | 2.654 | 2.681 | 2.660 | 2.663 | 2.663 | 2.667 | 2.651 | 0.022 |
| 2.068 | 3.6 | 2.569 | 2.570 | 2.586 | 2.610 | 2.607 | 2.636 | 2.612 | 2.616 | 2.617 | 2.618 | 2.604 | 0.022 |
| 2.184 | 3.8 | 2.524 | 2.519 | 2.537 | 2.564 | 2.559 | 2.595 | 2.595 | 2.568 | 2.569 | 2.570 | 2.557 | 0.023 |
| 2.298 | 4.0 | 2.473 | 2.467 | 2.489 | 2.515 | 2.508 | 2.535 | 2.516 | 2.524 | 2.520 | 2.520 | 2.507 | 0.023 |
| 2.410 | 4.2 | 2.429 | 2.421 | 2.442 | 2.468 | 2.463 | 2.480 | 2.469 | 2.478 | 2.475 | 2.471 | 2.460 | 0.021 |
| 2.534 | 4.4 | 2.380 | 2.370 | 2.391 | 2.412 | 2.412 | 2.419 | 2.418 | 2.425 | 2.422 | 2.420 | 2.407 | 0.019 |
| 2.654 | 4.6 | 2.333 | 2.317 | 2.340 | 2.360 | 2.364 | 2.361 | 2.369 | 2.373 | 2.373 | 2.370 | 2.356 | 0.019 |
| 2.766 | 4.8 | 2.288 | 2.274 | 2.295 | 2.311 | 2.317 | 2.314 | 2.322 | 2.324 | 2.324 | 2.320 | 2.309 | 0.017 |
| 2.890 | 5.0 | 2.239 | 2.226 | 2.244 | 2.252 | 2.266 | 2.254 | 2.272 | 2.271 | 2.274 | 2.270 | 2.257 | 0.016 |
| 3.000 | 5.2 | 2.196 | 2.187 | 2.195 | 2.202 | 2.219 | 2.204 | 2.224 | 2.218 | 2.226 | 2.231 | 2.210 | 0.015 |

| 3.116 | 5.4 | 2.142 | 2.138 | 2.143 | 2.144 | 2.168 | 2.146 | 2.174 | 2.163 | 2.176 | 2.171 | 2.157 | 0.015 |
|---|---|---|---|---|---|---|---|---|---|---|---|---|---|
| 3.240 | 5.6 | 2.094 | 2.091 | 2.093 | 2.091 | 2.114 | 2.092 | 2.118 | 2.109 | 2.121 | 2.112 | 2.104 | 0.012 |
| 3.360 | 5.8 | 2.043 | 2.042 | 2.041 | 2.032 | 2.060 | 2.042 | 2.067 | 2.052 | 2.067 | 2.051 | 2.050 | 0.012 |
| 3.474 | 6.0 | 2.000 | 2.000 | 1.995 | 1.985 | 2.011 | 1.997 | 2.019 | 2.007 | 2.020 | 2.003 | 2.004 | 0.011 |
| 3.588 | 6.2 | 1.953 | 1.947 | 1.947 | 1.936 | 1.967 | 1.950 | 1.974 | 1.959 | 1.972 | 1.954 | 1.956 | 0.012 |
| 3.704 | 6.4 | 1.896 | 1.889 | 1.894 | 1.888 | 1.910 | 1.900 | 1.919 | 1.907 | 1.917 | 1.902 | 1.902 | 0.011 |
| 3.820 | 6.6 | 1.853 | 1.847 | 1.850 | 1.847 | 1.866 | 1.852 | 1.874 | 1.858 | 1.874 | 1.861 | 1.858 | 0.010 |
| 3.940 | 6.8 | 1.796 | 1.786 | 1.795 | 1.790 | 1.810 | 1.795 | 1.818 | 1.797 | 1.814 | 1.795 | 1.800 | 0.011 |
| 4.054 | 7.0 | 1.761 | 1.750 | 1.756 | 1.752 | 1.722 | 1.759 | 1.779 | 1.758 | 1.777 | 1.759 | 1.757 | 0.016 |
| 4.174 | 7.2 | 1.696 | 1.684 | 1.692 | 1.679 | 1.711 | 1.695 | 1.717 | 1.696 | 1.716 | 1.699 | 1.699 | 0.013 |
| 4.294 | 7.4 | 1.655 | 1.643 | 1.647 | 1.637 | 1.663 | 1.647 | 1.671 | 1.647 | 1.666 | 1.646 | 1.652 | 0.011 |
| 4.408 | 7.6 | 1.595 | 1.585 | 1.589 | 1.572 | 1.606 | 1.589 | 1.614 | 1.593 | 1.612 | 1.591 | 1.595 | 0.013 |
| 4.256 | 7.8 | 1.542 | 1.535 | 1.540 | 1.527 | 1.548 | 1.532 | 1.554 | 1.535 | 1.553 | 1.531 | 1.540 | 0.009 |
| 4.638 | 8.0 | 1.500 | 1.492 | 1.491 | 1.476 | 1.508 | 1.492 | 1.516 | 1.497 | 1.512 | 1.494 | 1.498 | 0.012 |
| 4.256 | 8.2 | 1.424 | 1.419 | 1.418 | 1.412 | 1.427 | 1.417 | 1.434 | 1.427 | 1.431 | 1.418 | 1.423 | 0.007 |
| 4.868 | 8.4 | 1.393 | 1.388 | 1.381 | 1.371 | 1.395 | 1.387 | 1.402 | 1.392 | 1.398 | 1.390 | 1.390 | 0.009 |
| 4.984 | 8.6 | 1.305 | 1.302 | 1.293 | 1.289 | 1.306 | 1.302 | 1.315 | 1.311 | 1.311 | 1.306 | 1.304 | 0.008 |
| 5.108 | 8.8 | 1.272 | 1.272 | 1.260 | 1.257 | 1.269 | 1.266 | 1.273 | 1.273 | 1.270 | 1.270 | 1.268 | 0.006 |
| 5.166 | 9.0 | 1.232 | 1.233 | 1.214 | 1.215 | 1.233 | 1.234 | 1.244 | 1.244 | 1.237 | 1.237 | 1.232 | 0.010 |

FIG. 23B

EF represents measured response with fluid flow into the tank "empty-to-full"
FE represents measured response with fluid flow out of the tank "full-to-empty" condition.

| Fluid Level as indicated by capillary tube | Actual Qty lbs. Per Electronic Scale | Demonstrator Display Empty to Full "EF" | Qty lbs @ Indicated Ht. EF | Error EF H=(E-G)/E | Demonstrator Display Full to Empty "FE" | Qty lbs @ Indicated Ht. FE | Error FE K=(E-J)/E | Class I Min E-(B)(C) - E(A) | Class I Max E+(B)(C) + E(A) |
|---|---|---|---|---|---|---|---|---|---|
| D | E | F | G | H | I | J | K | L | M |
| 0.0 | 0.000 | 0.00 | 0.000 |  | 0.00 | 0.006 |  | -0.1033 | 0.1033 |
| 0.2 | 0.088 | 0.20 | 0.014 | 0.841 | 0.20 | 0.068 | 0.227 | -0.0188 | 0.1948 |
| 0.4 | 0.200 | 0.40 | 0.110 | 0.450 | 0.40 | 0.180 | 0.100 | 0.0887 | 0.3113 |
| 0.6 | 0.310 | 0.60 | 0.204 | 0.342 | 0.60 | 0.310 | 0.000 | 0.1943 | 0.4257 |
| 0.8 | 0.438 | 0.80 | 0.322 | 0.265 | 1.00 | 0.440 | -0.005 | 0.3172 | 0.5588 |
| 1.0 | 0.564 | 1.00 | 0.456 | 0.191 | 1.40 | 0.572 | -0.014 | 0.4381 | 0.6899 |
| 1.2 | 0.648 | 1.20 | 0.582 | 0.102 | 1.40 | 0.694 | -0.071 | 0.5188 | 0.7772 |
| 1.4 | 0.786 | 1.40 | 0.700 | 0.109 | 1.80 | 0.802 | -0.020 | 0.6512 | 0.9208 |
| 1.6 | 0.900 | 1.60 | 0.814 | 0.096 | 2.00 | 0.930 | -0.033 | 0.7607 | 1.0393 |
| 1.8 | 1.020 | 1.80 | 0.936 | 0.082 | 2.20 | 1.054 | -0.033 | 0.8759 | 1.1641 |
| 2.0 | 1.138 | 2.00 | 1.046 | 0.081 | 2.40 | 1.170 | -0.028 | 0.9892 | 1.2868 |
| 2.2 | 1.256 | 2.20 | 1.160 | 0.076 | 2.60 | 1.290 | -0.027 | 1.1024 | 1.4096 |
| 2.4 | 1.370 | 2.40 | 1.280 | 0.066 | 2.60 | 1.406 | -0.026 | 1.2119 | 1.5281 |
| 2.6 | 1.494 | 2.60 | 1.384 | 0.074 | 2.80 | 1.518 | -0.016 | 1.3309 | 1.6571 |
| 2.8 | 1.604 | 2.80 | 1.504 | 0.062 | 3.00 | 1.632 | -0.017 | 1.4365 | 1.7715 |
| 3.0 | 1.728 | 3.00 | 1.616 | 0.065 | 3.20 | 1.758 | -0.017 | 1.5556 | 1.9004 |
| 3.2 | 1.836 | 3.20 | 1.748 | 0.048 | 3.40 | 1.876 | -0.022 | 1.6592 | 2.0128 |
| 3.4 | 1.952 | 3.40 | 1.844 | 0.055 | 3.60 | 2.002 | -0.026 | 1.7706 | 2.1334 |
| 3.6 | 2.068 | 3.60 | 1.956 | 0.054 | 3.80 | 2.124 | -0.027 | 1.8820 | 2.2540 |
| 3.8 | 2.184 | 3.80 | 2.076 | 0.049 | 4.00 | 2.244 | -0.027 | 1.9933 | 2.3747 |
| 4.0 | 2.298 | 4.00 | 2.160 | 0.047 | 4.20 | 2.350 | -0.023 | 2.1028 | 2.4932 |
| 4.2 | 2.410 | 4.20 | 2.316 | 0.039 | 4.40 | 2.458 | -0.020 | 2.2103 | 2.6097 |
| 4.4 | 2.534 | 4.40 | 2.432 | 0.040 | 4.60 | 2.580 | -0.018 | 2.3293 | 2.7387 |

FIG. 25A

| | | | | | | | |
|---|---|---|---|---|---|---|---|
| 4.6 | 2.654 | 4.60 | 2.550 | 0.039 | 4.80 | -0.018 | 2.4445 | 2.8635 |
| 4.8 | 2.766 | 4.80 | 2.686 | 0.029 | 5.00 | -0.018 | 2.5520 | 2.9800 |
| 5.0 | 2.890 | 5.00 | 2.796 | 0.033 | 5.20 | -0.012 | 2.6711 | 3.1089 |
| 5.2 | 0.300 | 5.20 | 2.918 | 0.027 | 5.40 | -0.004 | 2.7767 | 3.2233 |
| 5.4 | 3.116 | 5.40 | 3.024 | 0.030 | 5.60 | -0.001 | 2.8880 | 3.3440 |
| 5.6 | 3.240 | 5.60 | 3.142 | 0.030 | 5.80 | 0.001 | 3.0071 | 3.4729 |
| 5.8 | 3.360 | 5.80 | 3.266 | 0.028 | 5.80 | 0.002 | 3.1223 | 3.5977 |
| 6.0 | 3.474 | 6.00 | 3.388 | 0.025 | 6.00 | 0.003 | 3.2317 | 3.7163 |
| 6.2 | 3.588 | 6.20 | 3.502 | 0.024 | 6.20 | 0.002 | 3.3412 | 3.8348 |
| 6.4 | 3.704 | 6.40 | 3.622 | 0.022 | 6.60 | 0.002 | 3.4525 | 3.9555 |
| 6.6 | 3.820 | 6.60 | 3.728 | 0.024 | 6.60 | 0.004 | 3.5639 | 4.0761 |
| 6.8 | 3.940 | 6.80 | 3.848 | 0.023 | 6.80 | 0.005 | 3.6791 | 4.2009 |
| 7.0 | 4.054 | 7.00 | 3.966 | 0.022 | 7.20 | 0.002 | 3.7885 | 4.3195 |
| 7.2 | 4.174 | 7.20 | 4.084 | 0.022 | 7.40 | 0.003 | 3.9037 | 4.4443 |
| 7.4 | 4.294 | 7.40 | 4.196 | 0.023 | 7.60 | 0.005 | 4.0189 | 4.5691 |
| 7.6 | 4.408 | 7.60 | 4.338 | 0.016 | 7.60 | 0.002 | 4.1284 | 4.6876 |
| 7.8 | 4.526 | 7.80 | 4.428 | 0.022 | 7.80 | 0.004 | 4.2416 | 4.8104 |
| 8.0 | 4.638 | 8.00 | 4.590 | 0.010 | 8.00 | 0.001 | 4.3492 | 4.9268 |
| 8.2 | 4.760 | 8.20 | 4.668 | 0.019 | 8.20 | 0.002 | 4.4663 | 5.0537 |
| 8.4 | 4.868 | 8.40 | 4.790 | 0.016 | 8.40 | 0.000 | 4.5700 | 5.1660 |
| 8.6 | 4.984 | 8.60 | 4.886 | 0.020 | 8.60 | 0.001 | 4.6813 | 5.2867 |
| 8.8 | 5.108 | 8.80 | 4.992 | 0.023 | 9.00 | -0.002 | 4.8004 | 5.4156 |
| 9.0 | 5.166 | 9.00 | 5.114 | 0.010 | 9.00 | 0.000 | 4.8560 | 5.4760 |

FIG. 25B

ELECTRO-OPTIC FLUID QUANTITY MEASUREMENT SYSTEM

CROSS-REFERENCE TO RELATED APPLICATIONS

This application claims priority under 35 U.S.C. §119(e) to U.S. provisional application No. 60/782,587, filed Mar. 14, 2006, the contents of which is incorporated by reference herein in its entirety.

TECHNICAL FIELD

The present invention relates to a system for measuring the level of a fluid in an enclosed or semi-enclosed volume.

BACKGROUND

A need to continuously measure the level of a fluid in an enclosed, or semi-enclosed volume exists in numerous commercial and military applications. For example, fluid-level sensors are commonly used to monitor fluid levels in aircraft, automobiles, and trucks. Fluid-level sensors are also used to monitor fluid levels within tanks utilized for fuel dispensing, wastewater treatment, chemical storage, food processing, etc.

Electrical fluid-level sensors present safety-related issues in many applications. For example, electrical fluid-level sensors have the potential to generate sparks, and thus present an explosion hazard when used in the presence of flammable fluids. Moreover, electromagnetic interference can, in some cases, corrupt or overwhelm the signals generated by and relied upon by electrical fluid-level sensors.

Electrical fluid-level sensors commonly rely on a float mechanically or magnetically coupled to an external gauge. Alternatively, electrical fluid-level sensors can operate on the principal that the dielectric constant between a pair of wires immersed or partially immersed in a fluid changes with the fluid level. This type of sensor, however, when used to detect fuel levels, loses accuracy as the amount of contaminants, e.g., water, in the fuel increases.

SUMMARY

Systems and methods determine the level, density, and/or temperature of a fluid based on the fluorescence of a material within an optical waveguide slab at least partially immersed in the fluid.

Systems for measuring a level of a fluid comprise a source of optical energy, and an optical waveguide slab in optical communication with the source optical energy. The optical waveguide slab is at least partially filled with a material that fluoresces when illuminated by optical energy produced by the source of optical energy. The systems also comprise a photodiode unit in optical communication with the optical waveguide slab. The photodiode unit comprises a photodiode and an amplifier communicatively coupled to the photodiode. The photodiode unit generates an electrical output in response to the fluorescence of the fluorescent material.

Systems for measuring the density and/or temperature of a fluid comprise a source of optical energy, and an optical waveguide slab in optical communication with the source of optical energy. The optical waveguide slab is least partially filled with a material that fluoresces when illuminated by optical energy produced by the source of optical energy. The systems also comprise a detector of optical energy in optical communication with the waveguide slab, wherein the detector of optical energy generates an output in response to the fluorescence of the fluorescent material. The systems further comprise a computing device communicatively coupled to the detector of optical energy. The computing device determines the density and/or temperature of the fluid based on an output of the detector of optical energy.

Systems for measuring a level of a first fluid in a volume that holds the first fluid and a second fluid located substantially above the first fluid and having a refractive index different than a refractive index of the first fluid comprise a light source that produces light of a first wavelength, and a light pipe in optical communication with the light source.

The systems also comprise an optical waveguide slab in optical communication with the light pipe and capable of being immersed in the first and second fluids. The optical waveguide slab comprising a material that emits light at a second wavelength when exposed to the light of the first wavelength and having a reflective surface oriented at an acute angle in relation of a longitudinal axis of the optical waveguide slab. The light pipe and the optical waveguide slab are unitarily formed or a bonding material is disposed in an interface between the light pipe and the optical waveguide slab. The systems also include a light detector in optical communication with the optical waveguide slab.

Methods comprise immersing an optical waveguide slab in a fluid of known identity so that a predetermined portion of a length of the optical waveguide slab is in optical communication with the fluid; illuminating the optical waveguide slab with optical energy; and determining the density and/or temperature of the fluid based on the fluorescence of a material within the optical waveguide slab in response to the optical energy.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings:

FIG. 13B is a cross-sectional view of the output connector shown in FIG. 13A, taken through the line "D-D" of FIG. 13A;

FIGS. 23A and 23B depict a table including data representing the response of the prototype system shown in FIGS. 19-22 to different quantities of Jet A aviation fuel;

FIGS. 25A and 25B depict a table including data representing the response of the prototype system shown in FIGS. 19-22 to different quantities of Jet A aviation fuel, after the prototype system has been programmed with calibration data based on the data presented in FIGS. 23A and 23B;

DETAILED DESCRIPTION OF ILLUSTRATIVE EMBODIMENTS

Figure 2:
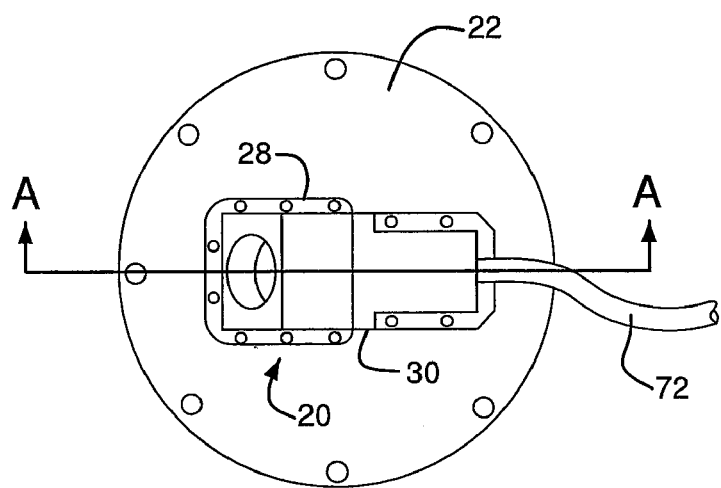
FIG. 2 is an upper view of the housing assembly and mounting plate depicted in FIG. 1.
Figure 3:
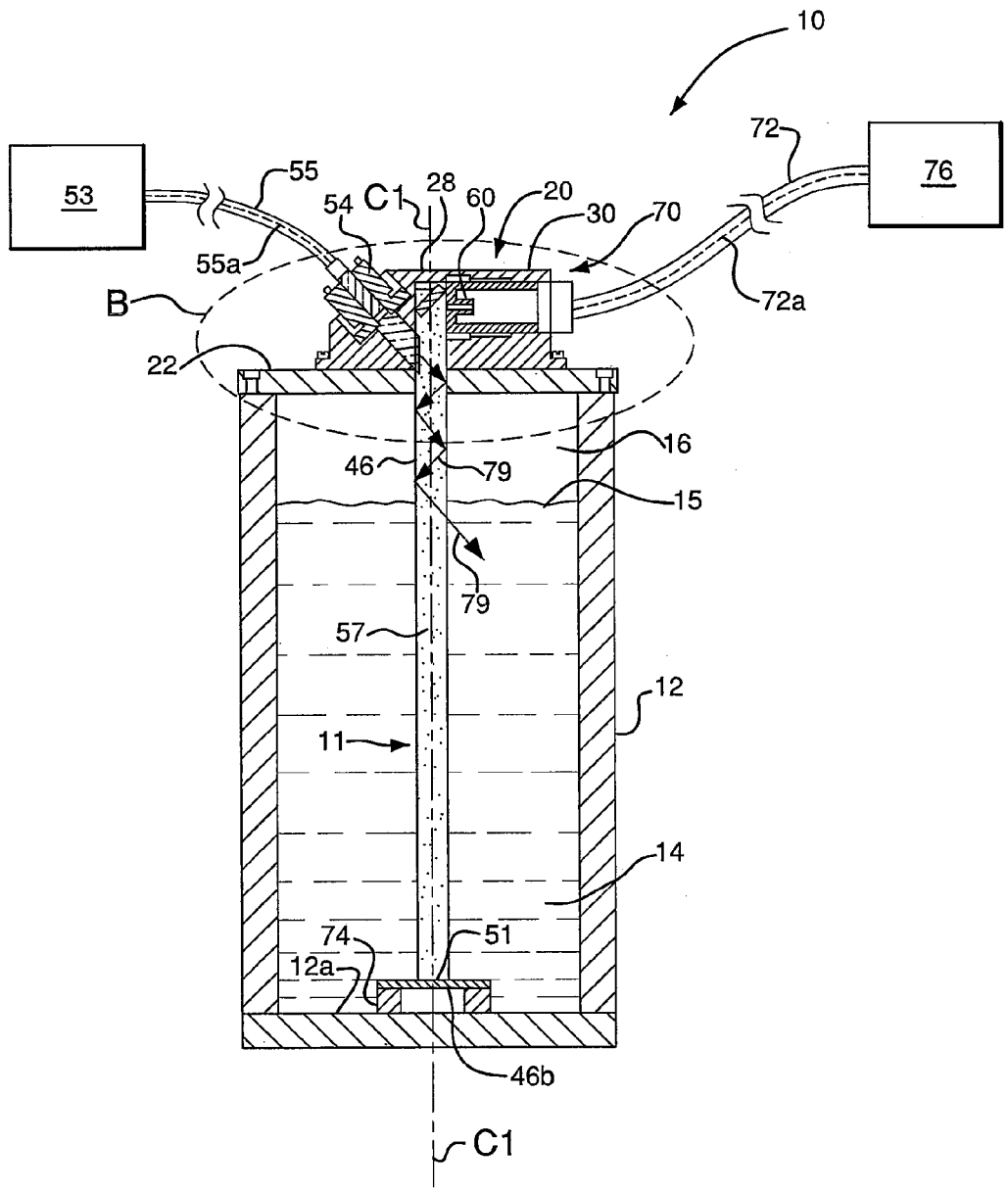
FIG. 3 is a cross-sectional view taken through the line "A-A" of FIG. 2 and further depicting a lighted-electronic diode, a photo-multiplier tube, and a signal processor of the system depicted in FIGS. 1 and 2.

An embodiment of an electro-optic fluid quantity measurement system 10 is depicted in FIGS. 1 to 16. The system 10 comprises an optical waveguide slab 11. The waveguide slab 11 can be installed in a tank 12, as shown in FIG. 3. The tank 12 can hold a fluid 14 such as water, Jet A aviation fuel, etc. The volume of the tank 12 above the fluid 14 is occupied by air 16. The interface between the air 16 and the fluid 14 is designated by the reference numeral 15. Details of the tank 12 depicted in the figures are presented for illustrative purposes only. The system 10 can be used in connection with tanks of virtually any size and shape, and with conformal as well as non-conformal tanks. Moreover, the volume above the fluid 14 can be occupied by a fluid other than air.

Figure 4:
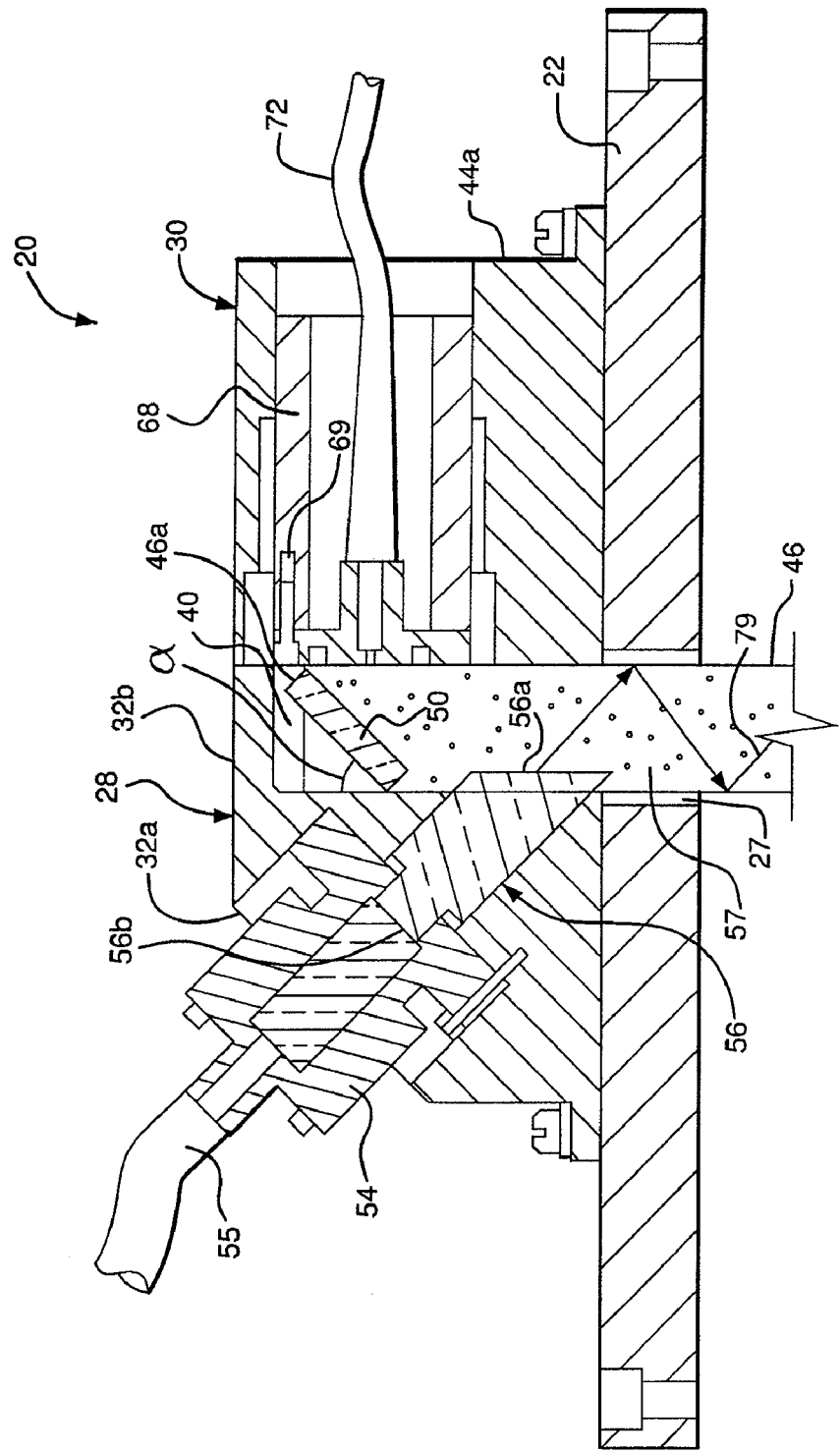
FIG. 4 is a magnified view of the area designated "B" in FIG. 3.
Figures 5, 6:
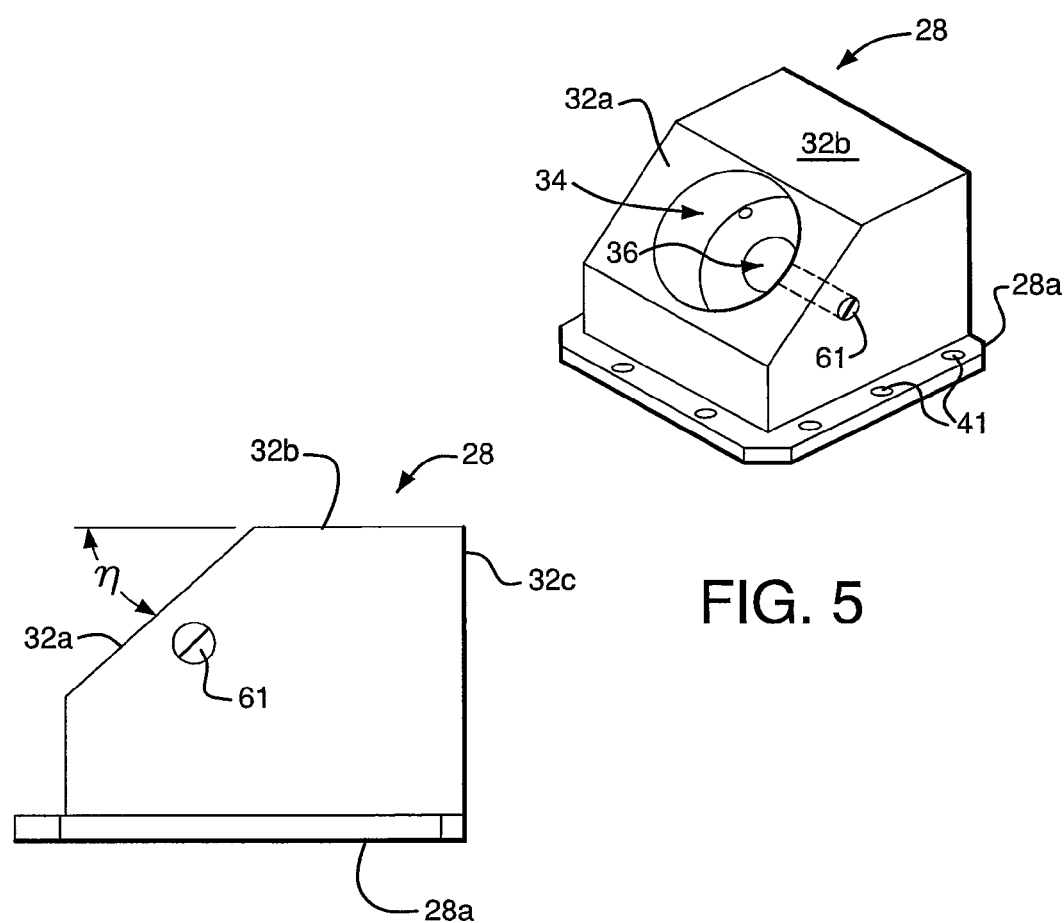
FIG. 5 is a perspective view of a waveguide housing of the electro-optic fluid quantity measurement system depicted in FIGS. 1-4.
FIG. 6 is a side view of the waveguide housing depicted in FIG. 5.
Figure 7:
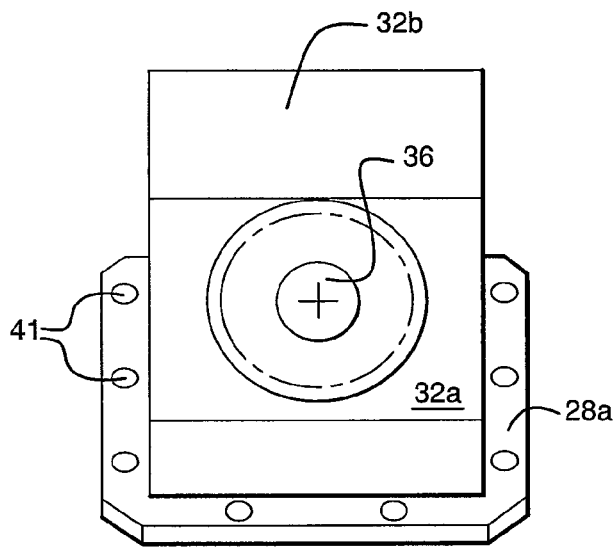
FIG. 7 is a top-side side view of the waveguide housing depicted in FIGS. 5 and 6.

The waveguide slab 11 comprises a sensing rod 46, as shown in FIGS. 3 and 4. The sensing rod 46 is formed from a transparent or semi-transparent material suitable for prolonged exposure to the fluid 14. For example, in applications where the fluid 14 is a petroleum-based product such as Jet A aviation fuel, the sensing rod 46 can be formed from five-percent or ten-percent samarium-doped optical filter glass, poly methyl methacrylate (PMMA) doped with a fluorescent dye, or other suitable materials.

The sensing rod 46 is elongated, and has a centerline designated by the symbol "C1" in FIGS. 3 and 4. The sensing rod 46 can have a substantially rectangular cross section, and defines a sealed volume. The sensing rod 46 can have a cross-sectional shape other than rectangular in alternative embodiments.

A top panel 46a of the sensing rod 46 can be beveled. More particularly, the top panel 46a can be disposed at an acute angle in relation to the centerline "C1." This angle is designated "α" in FIG. 4. The angle α can be approximately 45 degrees. The angle α can be greater or less than 45 degrees in alternative embodiments.

A first reflector in the form of a mirror 50 can be secured to an inner (lower) surface of the top panel 46a, as shown in FIG. 4. Hence, the mirror 50 is oriented at an angle of approximately 45 degrees in relation to the centerline "C2."

Directional terms such as "upper," "lower," "top," "bottom," etc. are used with reference to the component orientations depicted in FIG. 3. These terms are used for illustrative purposes only and, unless otherwise noted, are not intended to limit the scope of the appended claims.

The sensing rod 46 also includes a bottom panel 46b, as shown in FIG. 3. A second reflector in the form of a mirror 51 can be secured to an inner (upwardly facing) surface of the bottom panel 46b.

The mirrors 50, 51 can be first surface flat mirrors. It is believed that the use of first surface flat mirrors can help to maximize the reflection of the optical energy incident upon the mirrors 50, 52, since the incident light does not need to penetrate a layer of non-fluorescent glass in the mirrors in order to strike the reflective surface of each mirror.

A reflective coating can be applied the inner surfaces of the top panel 46a and the bottom panel 46b in lieu of the mirrors 50, 51 in alternative embodiments.

The internal volume of the sensing rod 46 is uniformly filled with a doping impurity (doping material) 57. The doping material 57 can be, for example, an organic dye having the following characteristics. The doping material 57 fluoresces and emits electromagnetic radiation when pumped (excited) by electromagnetic radiation within the spectral range of green light, i.e., light having a wavelength of approximately 530 nm. The electromagnetic radiation emitted by the doping material is believed to have a wavelength that is longer that that of the incident green light. U.S. Pat. Nos. 6,172,377 (Weiss) and 6,831,290 (Mentzer) each disclose the use of a waveguide filled with a fluorescent material to determine the level or quantity of a fluid. The contents of these patents are incorporated by reference herein in their entirety.

Figure 1:
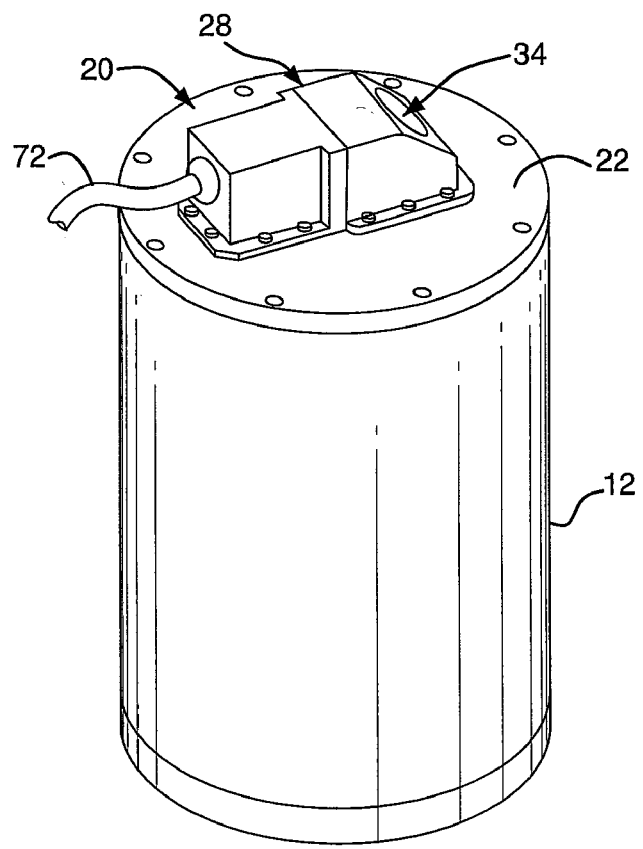
FIG. 1 is a perspective view of a housing assembly of an embodiment of an electro-optic fluid quantity measurement system, installed on a mounting plate of a tank containing a volume of fluid.

The waveguide slab 11 is suspended from the housing assembly 20, as explained in detail below. The housing assembly 20 is mounted on a mounting plate 22, as shown in FIGS. 1-3. The mounting plate 22, in turn, is mounted on the tank 12. The mounting plate 22 has a through hole 27 formed therein to permit the waveguide slab 11 to pass through the mounting plate 22 and into the tank 12, as shown in FIG. 4. A seal is positioned in the through hole 27, between the mounting plate 22 and the waveguide slab 11. The seal is not depicted in the figures, for clarity of illustration. A gasket (not shown) is positioned between the contacting surfaces of the tank 12 and the mounting plate 22 to inhibit leakage of the fluid 14 past the contacting surfaces.

The housing assembly 20 comprises a waveguide housing 28 and a connector housing 30. The waveguide housing 28 is depicted in detail in FIGS. 5-8. The waveguide housing 28 has an angled surface 32a. The angled surface 32a can be disposed at an angle of approximately 45 degrees in relation to an upper surface 32b of the waveguide housing 28 (this angle is denoted by the symbol "η" in FIG. 6). The angle η can be greater or less than 45 degrees in alternative embodiments.

A substantially circular bore 34 is formed in the waveguide housing 28, and extends inwardly from the angled surface 32a. A through hole 36 is also formed in the waveguide housing 28. The through hole 36 adjoins and extends inwardly from the bore 34. The bore 34 and the through hole 36 are substantially aligned, i.e., the respective centerlines of the bore 34 and the through hole 36 lie substantially along a common axis. Moreover, the centerlines of the bore 34 and the through hole 36 lie substantially perpendicular to the angled surface 32a, i.e., the bore 34 and the through hole 36 each extend in a direction substantially perpendicular to the angled surface 32a.

Figure 8:
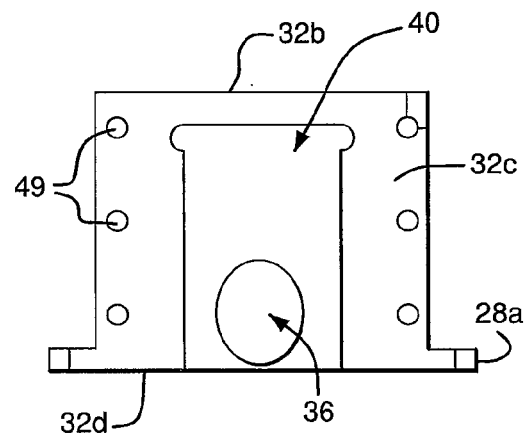
FIG. 8 is a side view of the waveguide housing depicted in FIGS. 5-7, rotated approximately ninety degrees from the perspective of FIG. 6.

A cavity 40 is formed in the waveguide housing 28, as shown in FIGS. 4 and 8. The cavity 40 extends inwardly from a side surface 32c and a bottom surface 32d of the waveguide housing 28, and adjoins the through hole 36. The cavity 40 accommodates the waveguide slab 11. More particularly, the cavity 40 is sized so that an upper end of the sensing rod 46 fits within the cavity 40 with minimal clearance, as shown in FIG. 4. The waveguide slab 11 is secured to the waveguide housing 28 through the use of wide-temperature bonding material such as EPON 828 difunctional bispheonel A/epichlorohydrin resin with Epikure 3370 modified cycloaliphatic amine curing agent mixed in a ratio of approximately 100 parts resin to approximately 38.5 parts curing agent by weight.

The waveguide housing 28 includes a flange portion 28a having a plurality of through holes 41 formed therein. The through holes 41 accommodate conventional fasteners that engage threaded holes formed in the mounting plate 22. The fasteners provide an additional means for securing the waveguide housing 28 to the mounting plate 22.

Figure 9:
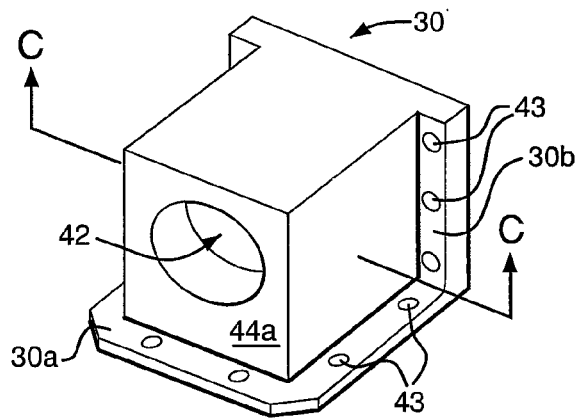
FIG. 9 is a perspective view of a connector housing of the electro-optic fluid quantity measurement system depicted in FIGS. 1-8.
Figure 10:
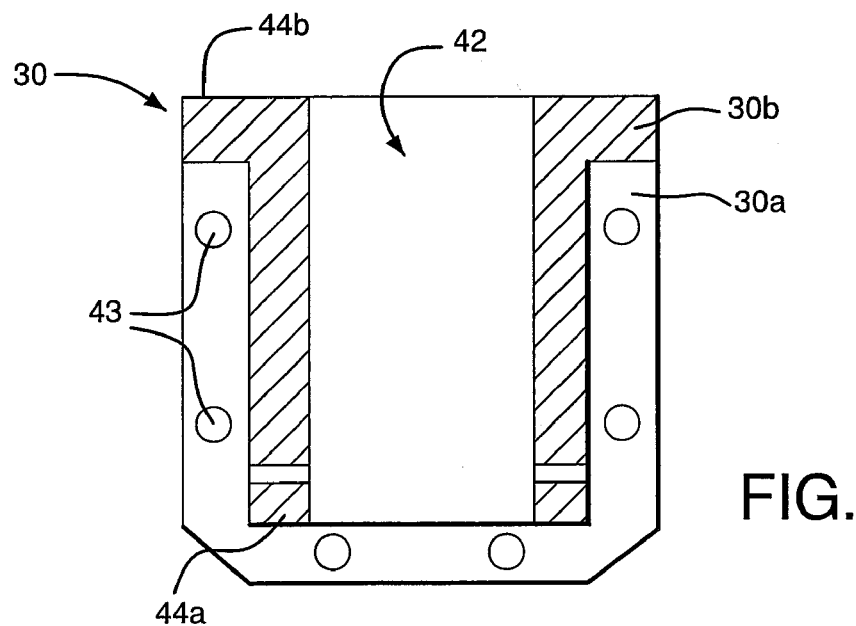
FIG. 10 is a cross-sectional view of the connector housing shown in FIG. 9, taken through the line "C-C" of FIG. 9.

The connector housing 30 has a passage 42 formed therein, as shown in FIGS. 9 and 10. The passage 42 extends between a first side surface 44a and a second side surface 44b of the connector housing 30. A centerline of the passage 42 lies substantially perpendicular to the first and second side surfaces 44a, 44b, i.e., the passage 42 extends in a direction substantially perpendicular to the first and second side surfaces 44a, 44b.

The second side surface 44b of the connector housing 30 abuts the side surface 32c of the waveguide housing 28 when the waveguide housing 28 and the connector housing 30 are installed on the mounting plate 22, as shown in FIG. 4. Moreover, the passage 42 adjoins the cavity 40 when the waveguide housing 28 and the connector housing 30 are installed on the mounting plate 22.

The connector housing 30 includes a first flange portion 30a and a second flange portion 30b each having a plurality of through holes 43 formed therein, as shown in FIG. 9. The through holes 43 located on the first flange portion 30a accommodate conventional fasteners that engage threaded holes formed in the mounting plate 22, thereby securing the waveguide housing 28 to the mounting plate 22. The through holes 43 located on the second flange portion 30b accommodate conventional fasteners that engage threaded holes 49 formed in the waveguide housing 28, thereby securing the connector housing 30 to the waveguide housing 28.

Figure 14:
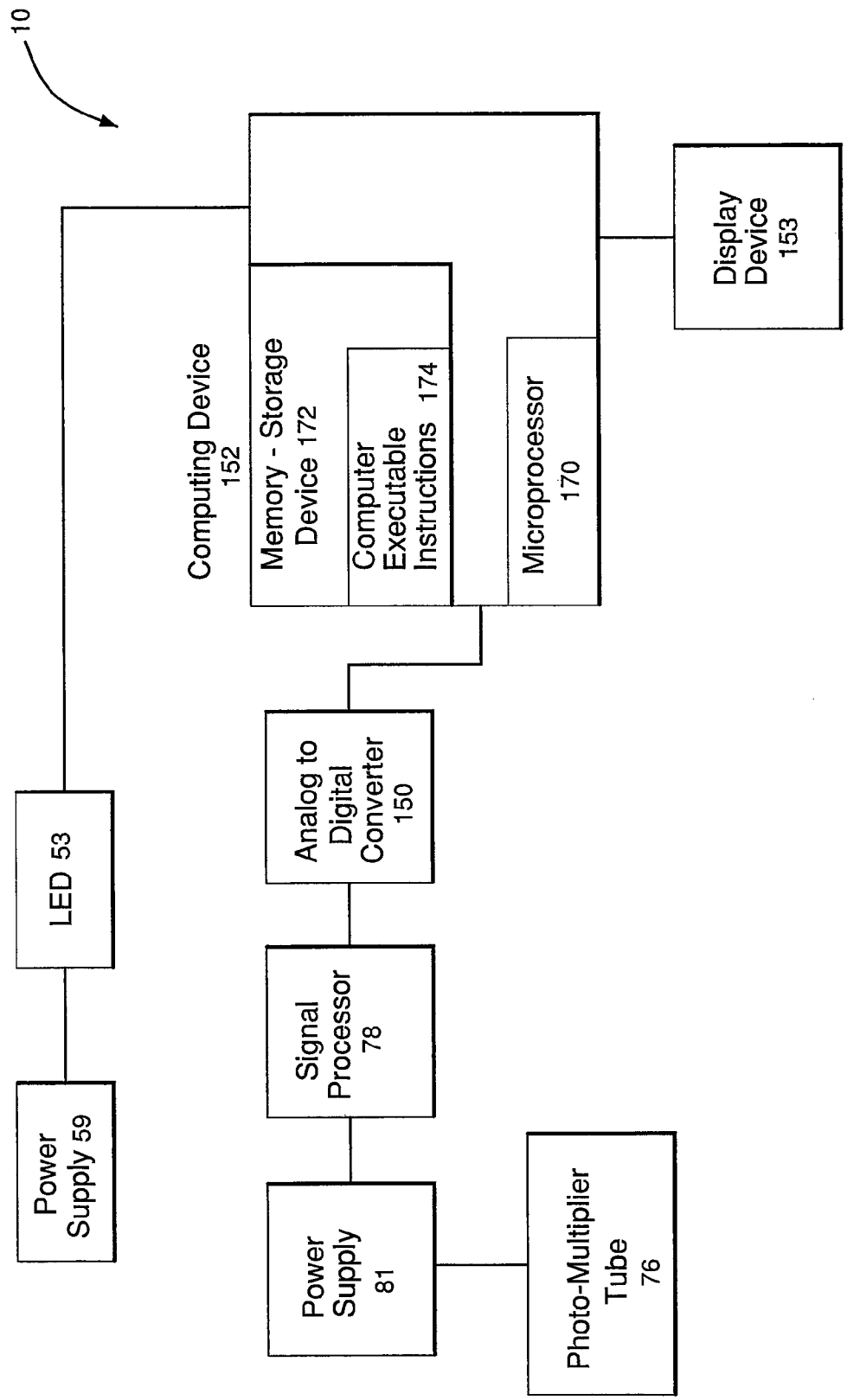
FIG. 14 is a block diagram depicting various electrical and electronic components of the system shown in FIGS. 1-13D.
Figure 15:
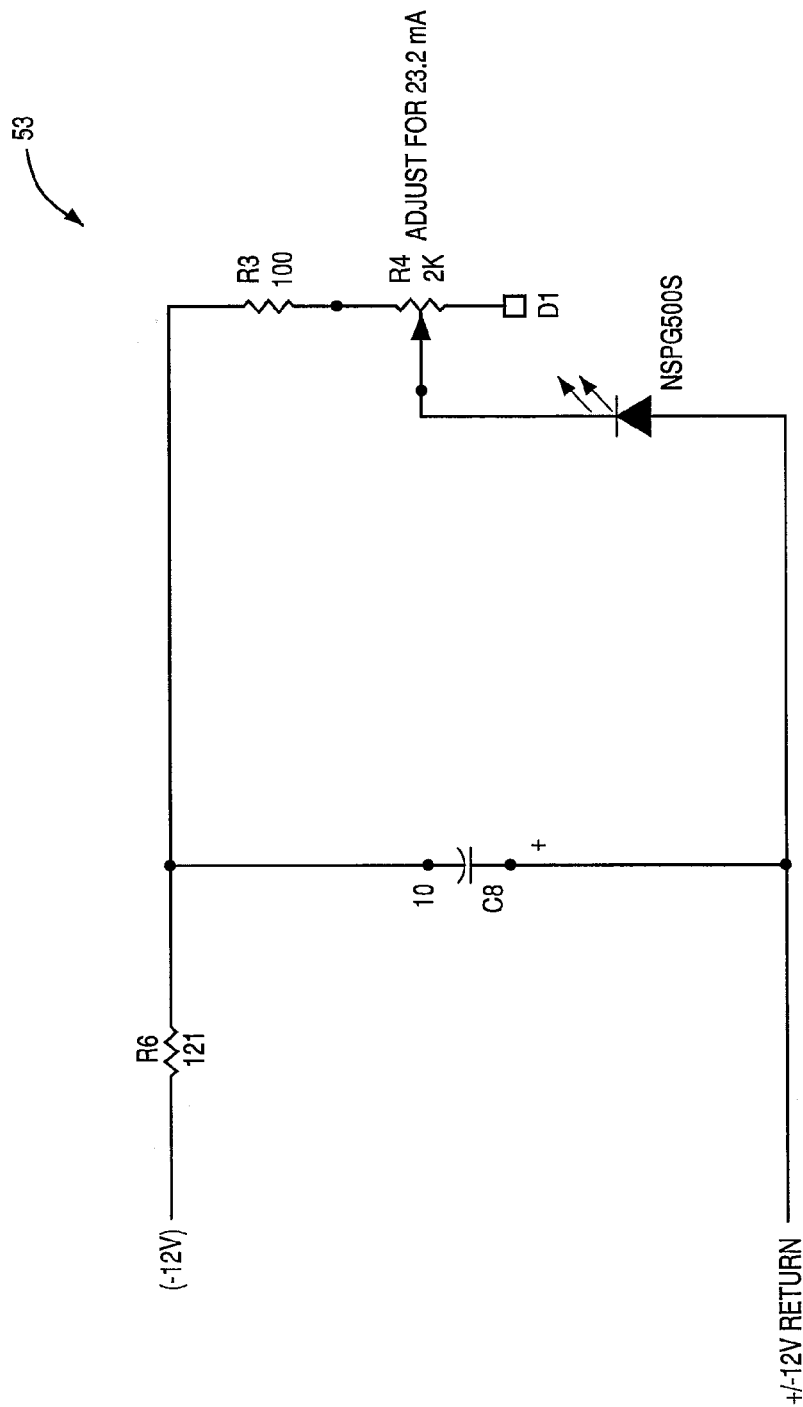
FIG. 15 is a schematic illustration of a lighted-electronic diode of the system show in FIGS. 1-14.

The system 10 further comprises a source of optical energy. The source of optical energy can be, for example, a high-intensity lighted electronic diode (LED) 53 that emits electromagnetic radiation at a peak wavelength of approximately 530 nm, i.e., within the spectral range green light. The LED 53 is depicted in FIGS. 3, 14, and 15. The LED 53 is located entirely outside of the tank 12, as shown in FIG. 3.

The LED 53 can be driven using direct current provided by a power supply 59 depicted shown in FIG. 14. The LED 53 can be selected to operate with an input of approximately 30 mA DC or less. The power supply 59 can be selected so as to have a relatively stable output, i.e., an output that varies by approximately +/−1 my or less. The output of the LED 53 can be stabilized as discussed in U.S. patent application Ser. No. 11/649,142, titled "Systems and Methods for Generating Optical Energy Using a Light-Emitting Diode," filed on Jan. 3, 2007, and the contents of which is incorporated by reference herein in its entirety.

Alternatively, the LED 53 can be pulsed during operation of the system 10. The pulsing can be achieved by a timing circuit, a microprocessor, or by an external computer operating application-specific software.

The LED 53 can communicate optically with the waveguide slab 11 by way of a fiber optic cable 55. The fiber optic cable 55 can include a single optical fiber 55a, as shown in FIG. 3. A fiber optic cable having more than one optical fiber can be used in the alternative. The light generated by the LED 53 is transmitted to the waveguide slab 11 by the fiber optic cable 55 and excites the doping material 57 within the waveguide slab 11, as explained in detail below.

The fiber optic cable 55 can be a multi-mode cable having a high numerical aperture and a large-diameter, i.e., 1,000-micron or greater, core for maximal light-transmission. Other types of fiber optic cables, including multi-fiber optic cables, can be used in alternative embodiments. The fiber optic cable 55 can include a black or otherwise opaque cover that prevents ambient light from entering the optical fiber 55a.

The use of the LED 53 is disclosed for exemplary purposes only. Virtually any type of light source capable of emitting in the desired spectral range, e.g., an argon gas laser, can be used in lieu of the LED 53. Moreover, a specific peak emission wavelength for the LED 53 is specified for illustrative purposes only. The optimal peak wavelength is application-dependent, and can vary with the specific type of dopant used in the material from which the waveguide slab 11 is fabricated.

The fiber optic cable 55 has a collimating lens assembly 54 mechanically coupled thereto and in optical communication therewith, as shown in FIGS. 3 and 4. The bore 34 of the waveguide housing 28 receives the collimating lens assembly 54. More particularly, an end portion of the collimating lens assembly 54 is sized to fit within the bore 34 with minimal clearance, thereby restraining the collimating lens assembly 54 (and the end of the fiber optic cable 55) from lateral movement, i.e., from movement perpendicular to the centerline of the bore 34.

The collimating lens assembly 54 is further secured to the waveguide housing 28 by a set screw 61 that prevents the collimating lens assembly 54 from backing out of the bore 34. The axial position of the collimating lens assembly 54, i.e., the position of the collimating lens assembly 54 along an axis corresponding to the centerlines of the bore 34 and the through hole 36, can be varied as necessary using the set screw 61.

The use of the collimating lens assembly is disclosed for exemplary purposes only. Other types of terminations for the fiber optic cable 55, such as a SELFOC fiber assembly, can be used in lieu of the collimating lens assembly 54.

Figure 11:
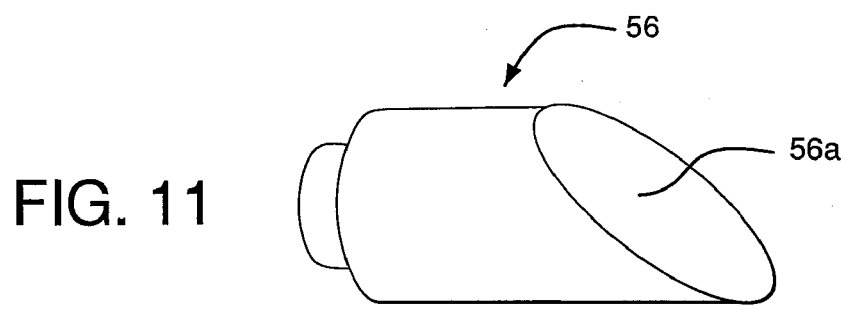
FIG. 11 is a perspective view of a light pipe of the system depicted in FIGS. 1-10.

The through hole 36 in the waveguide housing 28 receives a light pipe 56, as shown in FIGS. 4 and 11. The light pipe 56 is sized to fit within the through hole 36 with minimal clearance. The light pipe 56 can be bonded to the waveguide housing 28 using a bonding material such as EPON 828 difunctional bispheonel A/epichlorohydrin resin with Epikure 3370 modified cycloaliphatic amine curing agent mixed in a ratio of approximately 100 parts resin to approximately 38.5 parts curing agent by weight.

The light pipe 56 has a first and a second transparent end surface 56a, 56b. The first end surface 56a is beveled, i.e., disposed at an acute angle in relation to a centerline of the light pipe 56 (this angle is denoted by the symbol "β" in FIG. 4). Preferably, the angle β is approximately 45 degrees for simplicity of manufacture. The angle β can chosen to have other values, however, to achieve optimum performance based on the expected range of the index or refraction of the fluid 14 within the tank 12 and the index or refraction of the slab waveguide 11.

The end 56a of the light pipe 56 lies substantially flush with an end of the through hole 36. In other words, the light pipe 56 extends through an entirety of the through hole 36 without protruding substantially into the cavity 40, as shown in FIG. 4.

The light pipe 56 is in optical communication with the collimating lens assembly 54. Hence, light generated by the LED 53 is transmitted through the optical fiber 55a of the fiber optic cable 55 to the collimating lens assembly 54, which collimates and focuses the light. The light subsequently passes through the light pipe 56 and into the waveguide slab 11.

A bonding material such as EPON 828 difunctional bispheonel A/epichlorohydrin resin with Epikure 3370 modified cycloaliphatic amine curing agent mixed in a ratio of approximately 100 parts resin to approximately 38.5 parts curing agent by weight can be applied to the interface between the collimating lens assembly 54 and the light pipe 56. The bonding material can also be applied to the interface between the light pipe 56 and the sensing rod 46 of the waveguide slab 11. The use of the noted bonding material in these interfaces is believed to enhance the optical coupling between the collimating lens assembly 54, the light pipe 56, and the sensing rod 46, and thereby promotes repeatable and monotonic response from the system 10. Alternatively, the light pipe 56 and the sensing rod 46 can be unitarily formed. Forming these components unitarily can eliminate potential problems caused by degradation of the optical cement due to the vibrations and extreme temperatures to which the system 10 may be exposed in some applications.

The collimating lens assembly 54 can be oriented so as to cause the light to enter the waveguide slab 11 at an angle of approximately 45 degrees in relation to the centerline C1 of the waveguide slab 11. This particular entry angle is specified for exemplary purposes only; the optimum entry angle is a function of the optical characteristics of the waveguide 11 and the fluid 14 within the tank 12, and therefore can vary from the specified value in other applications.

The system 10 further comprises an output connector 60, and a fiber optic cable 72. The fiber optic cable 72 preferably comprises a single optical fiber 72a, as shown in FIG. 3. The fiber optic cable 72 can be a multi-mode cable having a high numerical aperture and a large-diameter, i.e., 1,000-micron or greater, core for maximal light-transmission and minimal signal to noise ratio. Other types of fiber optic cables, including multi-fiber cables, can be used in alternative embodiments. The fiber optic cable 72 can include a black or otherwise opaque cover that prevents ambient light from entering the optical fiber 72a.

The output connector 60 includes a body portion 62 and a sleeve portion 64 that adjoins the body portion 62, as shown in FIGS. 13A-13D. The body portion 62 and the sleeve portion 64 define a passage 65 that securely receives an end of the fiber optic cable 72.

The output connector 60 is positioned within the passage 42 of the connector housing 30 as shown in FIG. 4. The body portion 62 is sized to fit within the passage 42 of the connector housing 30 with minimal clearance. A cylindrical sleeve 68 can be inserted in the passage 42 as shown in FIG. 4, to prevent the output connector 60 from backing out of the passage 42. The sleeve 68 can be retained in the passage 42 by, for example, a press fit between the sleeve 68 and the surface of the connector housing 30 that defines the passage 42. The output connector 60 can be secured to the sleeve 68 by a suitable means such as fasteners 69.

The body portion 62 has an aperture 66 formed therein, as shown in FIG. 13B. The aperture 66 is aligned with the optical fiber 72a of the fiber optic cable 72, so that the optical fiber 72a is in optical communication with the sensing rod 46 and the mirror 50 by way of the aperture 66. The output connector 60 is positioned within the passage 42 so that the end of the optical fiber 72a is spaced from the adjacent surface of the sensing rod 46 by a gap of approximately 0.144 inch.

An O-ring gasket 71 provides a seal between the waveguide slab 11 and the end of the optical fiber 72a mounted in the output connector 60. The gasket 71 is disposed within a groove 67 formed in the body portion 62 of the output connector 60 as shown in FIG. 13B, and abuts the sensing rod 46 of the waveguide slab 11. The gasket 71 discourages condensation and moisture from other sources from entering the gap between the optical fiber 72a and the waveguide slab 11, thereby reducing the potential for such moisture to interfere with the transmission of light from the mirror 50 to the optical fiber 72a.

The system 10 further comprises a detector of optical energy in the form of a photo multiplier tube (PMT) 76, as shown in FIGS. 3 and 14. The PMT 76 is optically and mechanically connected to the fiber optic cable 72, and is positioned entirely outside of the tank 14. The PMT 76 generates an analog electrical output that is proportionate to the amount of light that is reflected from the mirror 52 and transmitted to the PMT 76 via the optical fiber 72a of the fiber optic cable 72.

Figure 16:
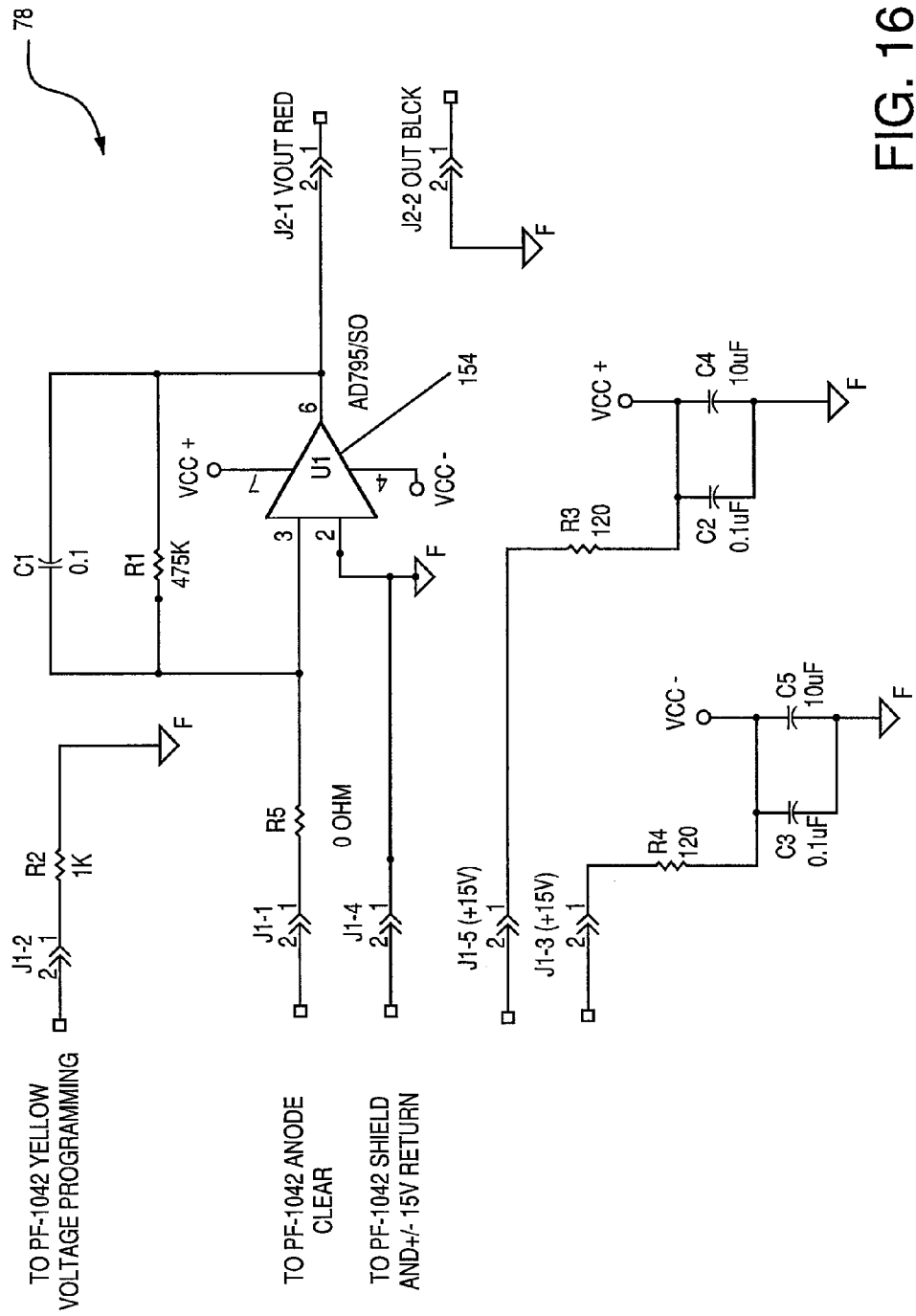
FIG. 16 is a schematic illustration of a signal processor of the system shown in FIGS. 1-15.

The system 10 further comprises a signal processor 78, an analog-to-digital (A/D) converter 150, and a computing device 152, as shown in FIGS. 14 and 16. The signal processor 78 receives the output current of the PMT 76, and generates an analog voltage representative of the output current. The A/D converter 150 is communicatively coupled to the signal processor 78 and the computing device 152. The A/D converter 150 converts the analog voltage from the signal processor 78 into a digital signal suitable for processing by the computing device 152.

The LED 53 can be communicatively coupled to the computing device 152 as depicted in FIG. 14, so that the computing device 152 can activate and deactivate the LED 53. The LED can be activated and deactivated independently of the computing device 152 in alternative embodiments.

The signal processor 78 can be configured as depicted in FIG. 16. The signal processor 78 comprises an operational amplifier 154 that forms part of the current-to-voltage converter circuitry of the signal processor 78. The amplifier 154 can be, for example, a model AD795 low power, low noise precision field-effect transistor (FET) operational amplifier having an input offset current specification of 0.1 pA, available from Analog Devices Inc., of Norwood, Mass. The use of this particular operational amplifier satisfies the recommendation of various PMT manufacturers that the PMT anode current be less than 1 µA, and the current input to the current-to-voltage converter be approximately 0.1 pA.

The signal processor 78 can be configured in a manner other than that shown in FIG. 14, in alternative embodiments.

The signal processor 78 and the PMT 76 are driven by a power supply 81, as shown in FIG. 14. The power supply 81 provides the +/−direct current required to power the signal processor 78, and the high voltage required to power the PMT 76. The power supply 81 can be, for example, a PF-1042 solid-state power supply available from Burle Industries, Inc. of Lancaster, Pa.

Figure 17:
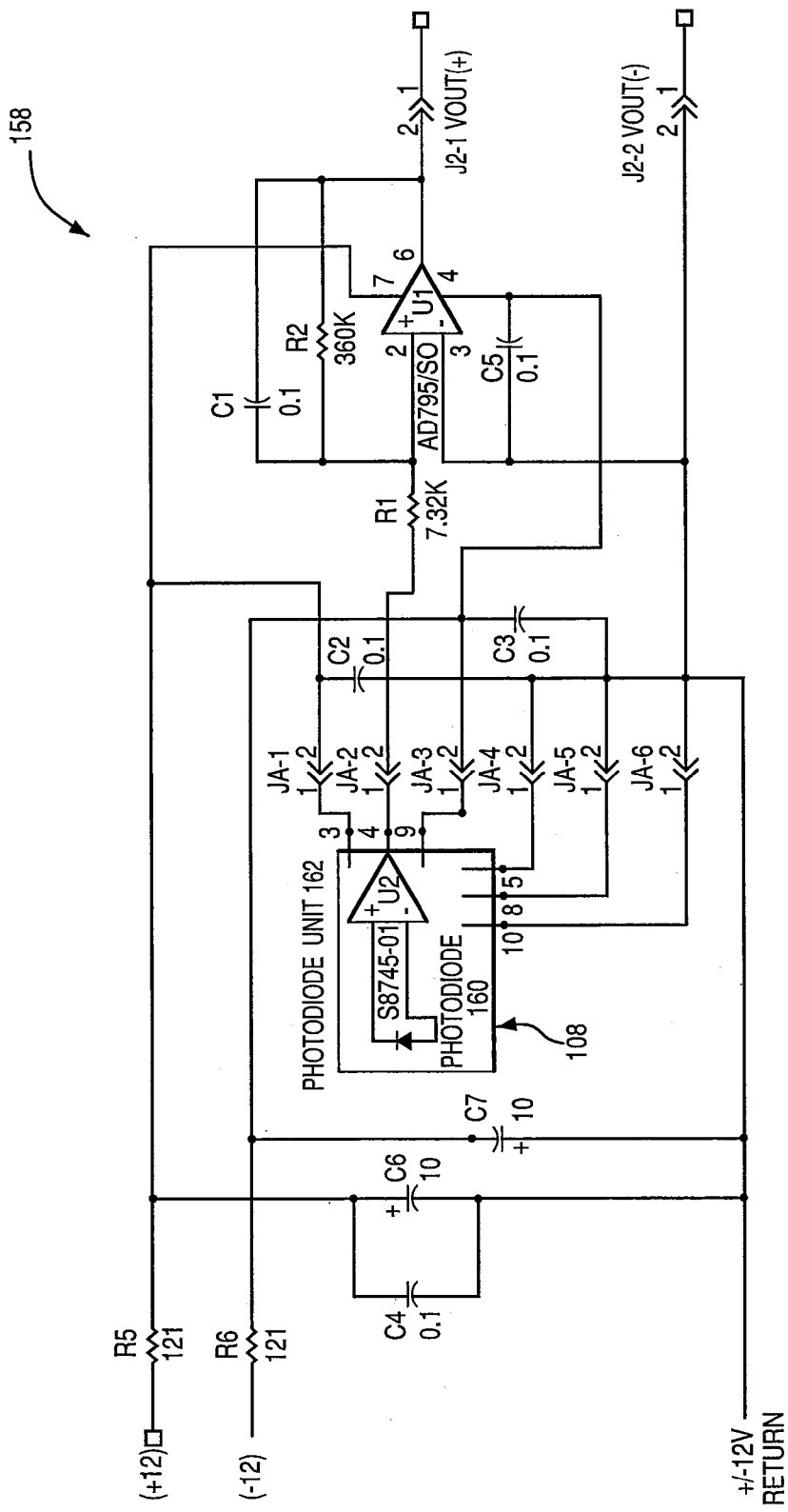
FIG. 17 is a schematic illustration of an electrical circuit that can be used in lieu of a photo-multiplier tube and signal processor of the system shown in FIGS. 1-16.

Detectors of optical energy other than PMTs can be used in alternative embodiments. For example, alternative embodiments can include a photodiode in lieu of the PMT 76. FIG. 17 depicts an electrical circuit 158 that can be used in lieu of the PMT 76 and the signal processor 78. The circuit 158 comprises a photodiode 160 for measuring the amount of light that is reflected from the mirror 52 and transmitted to the photodiode 160 via the optical fiber 72a of the fiber optic cable 72.

A model S8745-1 Si photodiode with preamp, available from Hamamatsu Corp. USA, of Bridgewater, N.J. can be used as the photodiode 160. This particular unit also includes an operational amplifier U2, and a lens. The photodiode 160, amplifier U2, and lens form an integrated unit packaged within a single housing. The photodiode 160, amplifier U2, and lens are collectively referred to hereinafter as a photodiode unit 162. Moreover, the photodiode unit 162 can be installed in a housing that facilitates mounting of the photodiode unit 162 to an enclosure, and permits the photodiode unit 162 to accept a fiber optic cable directly. The photodiode unit 162 is depicted on the right side of FIG. 18.

The circuit 158 also includes an operational amplifier U1 that forms part of the current-to-voltage converter circuitry of the circuit 158. The amplifier U1 can be the model AD795 operational amplifier discussed above in relation to the processor 78. The resistors R1, R2, and C1 of the circuit 158 are filter and gain-setting components.

The resistors R5 and R6 of the circuit 158 limit the output of the amplifier U1 to a level compatible with the A/D converter 150. The optimal resistance values for the resistors R5 and R6 are dependent upon the requirements of the A/D converter 150; a specific value for each resistance therefore is not specified herein.

A photodiode with an integrated amplifier, such as the photodiode unit 162, is able to detect relatively low levels of light. The use of the photodiode unit 162, in combination with various other features of the system 10 that enhance the amount of light that reaches the photodiode unit 162 from the waveguide slab 11, facilitate the use of a photodiode to measure the light emitted by the waveguide slab 11 when the doping material 57 therein is excited.

The use of a photodiode in lieu of a PMT, it is believed, can provide various benefits. For example, the solid-state configuration of a photodiode, in general, makes a photodiode more robust, and causes the photodiode to consume less power in comparison to a PMT of comparable capabilities. Also, PMTs such as the PMT 76 can require as much as several hours to stabilize; most photodiodes, by contrast, do not require any significant stabilization time.

Figure 18:
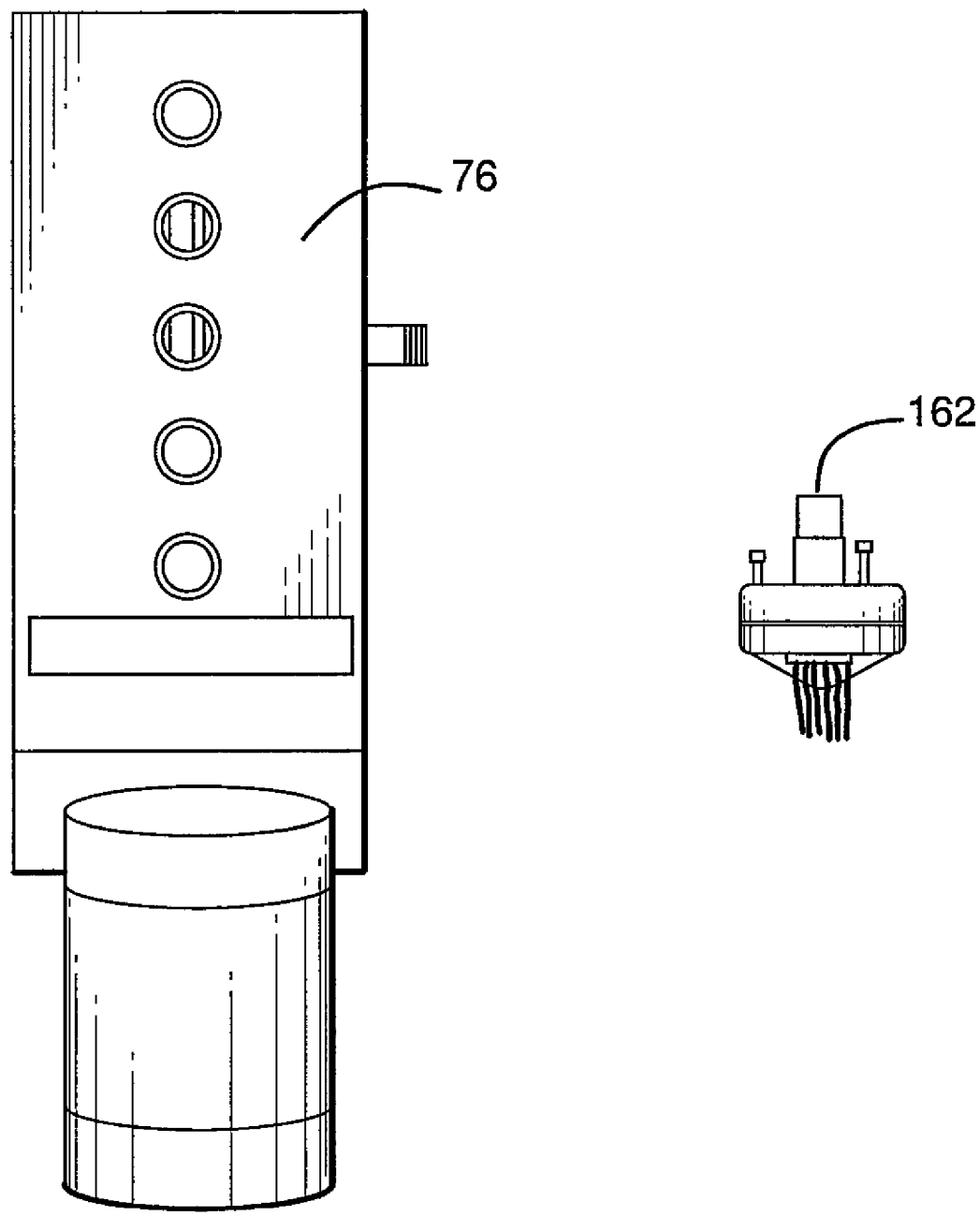
FIG. 18 is a side by side comparison of the photo-multiplier tube of the system shown in FIGS. 1-16, and a photodiode unit of the electrical circuit shown in FIG. 17.

Moreover, photodiodes, in general, are smaller than PMTs. For example, its is believed that the photodiode unit 162 consumes about 7 mW of power, while a comparable PMT will consume about 975 mW under comparable operating conditions. Also, the footprint, i.e., the overall dimensions, of the photodiode unit 162 is substantially less than those of a comparable PMT. FIG. 18 depicts the photodiode unit 162 positioned next the PMT 76, and demonstrates the significantly smaller overall dimensions of the photodiode unit 162. In applications where the level of the light emitted from the waveguide slab 11 is relatively low, or changes over many decades of dynamic range, the use of a PMT would generally be preferred over the use of a solid state photodiode.

The computing device 152 comprises a processor such as a microprocessor 170, as shown in FIG. 14. The computing device 114 also comprises a memory-storage device 172 communicatively coupled to the microprocessor 170, and a set of computer-executable instructions 174 stored on the memory-storage device 172.

The computing device 152 processes the digital output from the A/D converter 150. The output of the A/D converter 150 is representative of the response of the PMT 76 or the photodiode 102 to the output light from the waveguide slab 11. The computing device 152 can be programmed to process the digital output from the A/D converter 150 into a form suitable for display on a display device 153 shown in FIG. 14. For example, the processed signal can be displayed as a digital read-out showing the quantity of fluid in the tank 12 as a percentage of the total capacity of the tank 12, or in units such as gallons or liters. The computing device 152 can also be programmed to generate an output suitable for use by an alarm device, a recording or memory-storage device, and/or to another signal processing device.

Figure 12:
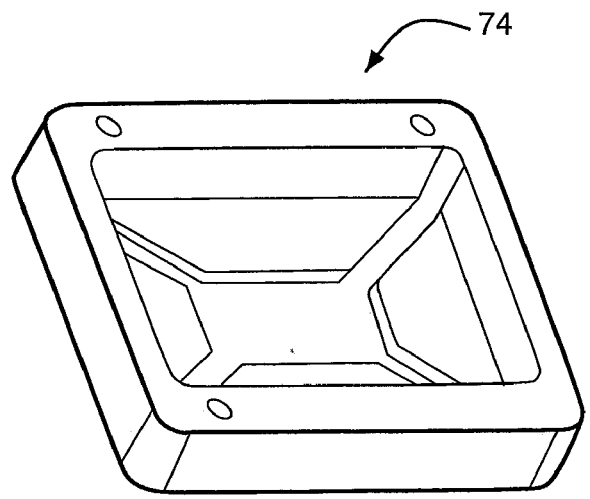
FIG. 12 is a perspective view of a snubber of the system depicted in FIGS. 1-11.
Figure 13A:
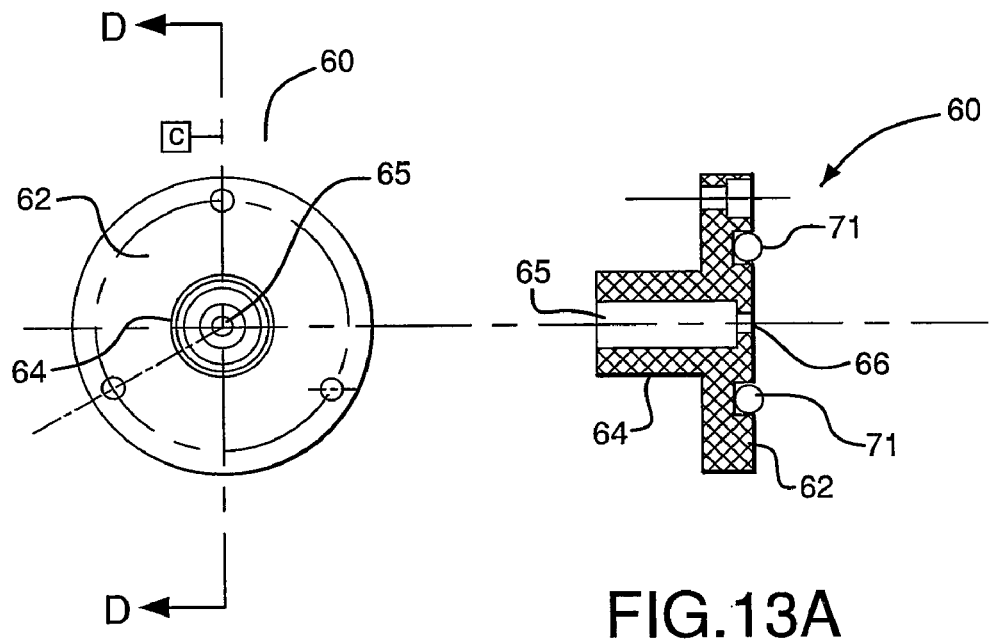
FIG. 13A is a front view of an output connector of the system shown in FIGS. 1-12.
Figure 13C:
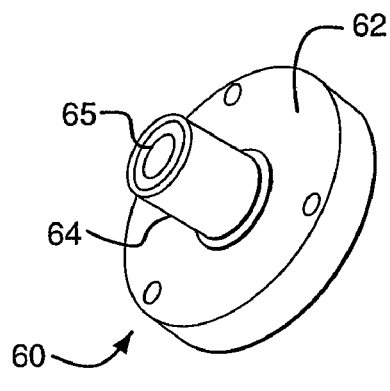
FIG. 13C is a front perspective view of the output connector shown in FIGS. 13A and 13B.
Figure 13D:
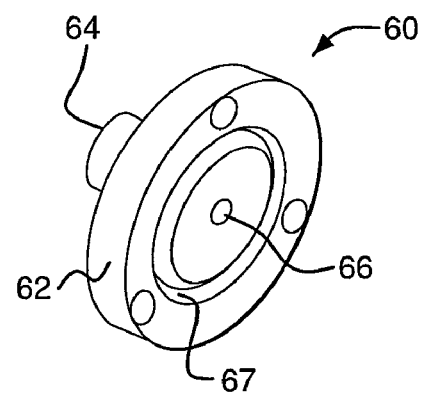
FIG. 13D is a rear perspective view of the output connector shown in FIGS. 13A-13C.

The system 10 further comprises a dampener, or snubber 74 as shown in FIGS. 3 and 12. The snubber 74 is fixedly coupled to a base 12a of the tank 12. The snubber 74 can be formed from virtually any resilient material having suitable damping characteristics. The snubber 74 receives a bottom end of the sensing rod 46. The snubber 74 acts as a dashpot that dampens vibration of the sensing rod 46 induced by sources external to the tank 12. Alternative embodiments can include one or more additional dampeners similar to the snubber 74 and interspersed along the length of the sensing rod 46. For example, additional dampeners may be needed in applications where the required length of the sensing rod is substantially greater than that of the sensing rod 46.

Operational details relating to the system 10 are as follows. The LED 53 emits electromagnetic radiation that peaks within the spectral range of green light, as noted previously. The electromagnetic radiation generated by the LED 53 is hereinafter referred to as "the input light," and is represented diagrammatically by the arrows 79 in FIGS. 3 and 4. The input light is transmitted to the collimating lens assembly 54 by way of the optical fiber 55a of the fiber optic cable 55. The collimating lens assembly 54 focuses the input light into the waveguide slab 11 by way of the light pipe 56.

The orientation of the collimating lens assembly 54 causes the input light to enter the sensing rod 46 of the waveguide slab 11 at an angle of approximately 45 degrees in relation to the centerline C1 of the waveguide slab 11, as explained previously. This angle is greater that the critical angle, i.e., the angle above which substantially all of the input light will be reflected from the internal surfaces of the sensing rod 46 located above the fluid-air interface 15. The critical angle at a particular vertical location on the waveguide 11 is a function of the refractive index of the fluid surrounding the waveguide 11 at that particular location.

The reflection of the input light within the waveguide 11 is believed to cause the input light to scintillate, or bounce in a zigzag pattern, down the portion of the waveguide 11 located above the air-fluid interface 15, as depicted in FIGS. 3 and 4. In other words, the input light is reflected back and forth between opposing internal surfaces of the sensing rod 46 at an angle of approximately 45 degrees.

The input light, upon striking the doping material 57 within the sensing rod 46, is believed to excite, or "pump," the doping material 57, thereby causing the doping material 57 to emit electromagnetic radiation that peaks in a spectral range equal to or greater than that of the input light. The electromagnetic radiation emitted by the doping material 57 is hereinafter referred to as "the output light."

It is believed that the input light is not reflected from the internal surfaces of the sensing rod 46 located below the air-fluid interface 15. In particular, the refractive index of the fluid 14 is greater than that of the air 16. Hence, the critical angle differs between the portions of the waveguide slab 11 located above and below the air-fluid interface 15. The 45-degree angle at which the input light strikes the internal surfaces of the sensing rod 46 is lower than the critical angle for the portion of the waveguide slab 11 located below the air-fluid interface 15. Hence, the input light striking the internal surfaces of the sensing rod 46 apparently is not reflected, but rather is transmitted out of the waveguide slab 11 and into the fluid 16. The 45-degree angle at which the input light strikes the internal surfaces of the sensing rod 46 is believed to be the optimal angle when the fluid 14 is water; the optimal value for this angle will vary with the type of fluid 14 stored in the tank 12.

It is believed that most of the doping material 57 located below the air-fluid interface 15 is not excited by the input light and does not fluoresce, i.e., does not emit electromagnetic radiation in the spectral range of the output light, because most the input light is transmitted out of the waveguide slab 11 upon reaching the air-fluid interface 15. Hence, the total amount of fluorescence, i.e., the total amount of the output light generated in the waveguide slab 11, is related to, and can be correlated with, the location of the air-fluid interface 15. The location of the air-fluid interface 15, in turn, provides an indication of level of the fluid 16 within the tank 12.

A portion of the output light generated by the doping material 57 travels upward through the sensing rod 46, and eventually reaches the mirror 50. The amount of intensity of the output light reaching the mirror 50 is believed to be increased by the reflector 51 located at the bottom of the sensing rod 46, which reflects, i.e., upwardly directs, a portion of the output light that initially travels downward within the waveguide slab 11.

The mirror 50, as noted above, is in optical communication with the optical fiber 72a of the fiber optic cable 72. The angled orientation of the mirror 50 causes the mirror 50 to reflect the output light incident thereupon toward the optical fiber 72a. The mirror 50 thus turns the output light by approximately 90 degrees. The optical fiber 72a of the fiber optic cable 72 transmits the output light to the PMT 76.

The PMT 76, upon receiving the emitted light, generates an analog electrical signal that is representative of the intensity of the output light incident thereupon. The signal generated by the PMT 76 is transmitted to the signal processor 78, which processes and converts the signal into an analog voltage denoted as "$V_{OUT}$" in FIG. 16.

The analog output voltage of the signal processor 78 is converted to a digital signal by the A/D converter 150. The digital signal is transmitted to the computing device 152. The computing device 152 can compute the quantity of fluid in the tank 12 based on predetermined information relating the response of the PMT 76 to the fluid quantity. The predetermined information can be generated, for example, by performing a calibration in which the response of the PMT 76 is evaluated in the presence of known quantities of fluid in the tank 12.

The fluid quantity determined by the computing device 152 can be transmitted to the display device 153, and/or to other devices such as an alarm, a recording or memory-storage device, or another signal processing device.

Applicants constructed an electro-optic system for measuring fluid quantity, and evaluated the response of the system using different types of fluids. The system is depicted in part in FIGS. 19-22, and is hereafter referred to as "the prototype system." Unless otherwise noted below, the configuration of the prototype system was substantially the same as that of the system 10.

The prototype system included a waveguide slab formed from five-percent samarium-doped optical filter glass. The prototype system also included a circuit substantially identical to the circuit 158 discussed above, including the model S8745-1 Si photodiode with preamp; the circuit used in the prototype system is hereinafter referred to a "the signal processing circuit."

A Nichia NSPG500S LED was used as the source of optical energy in the prototype system. The LED was driven at a current of approximately 23 to approximately 24 mA DC, and emitted at a peak wavelength of approximately 530 nm. A potentiometer, depicted in FIG. 19, was used to precisely set the drive current for the LED.

OMMJ-55-UVVIS-1000/1035-3-3-BL multimode optical fiber cables having a 1000-micron core and opaque coating, available from Oz Optic, were used to optically connect the waveguide slab to the LED and the photodiode of the signal processing circuit.

Figure 20:
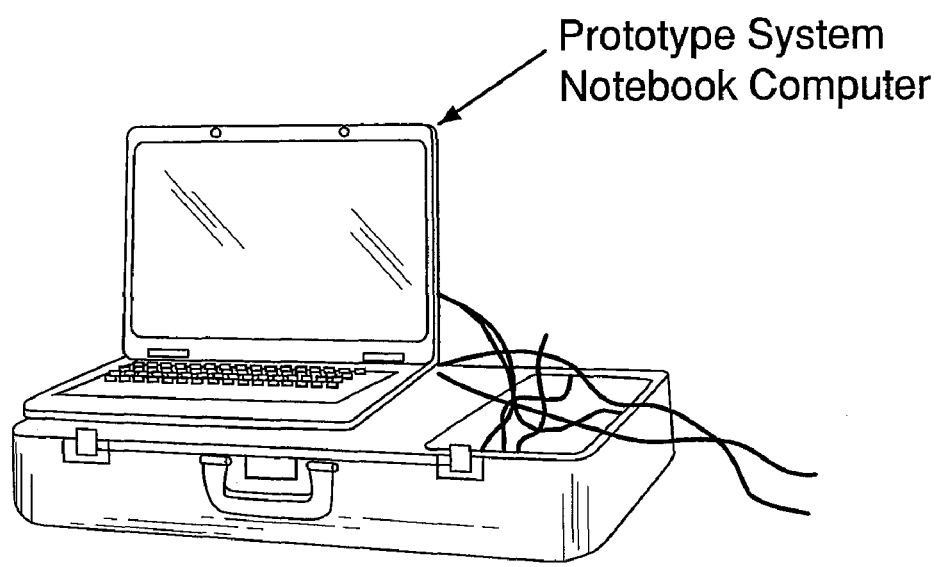
FIG. 20 depicts a notebook computer of the prototype system shown in FIG. 19.

A Del 9300 notebook computer, depicted in FIG. 20, was used as the computing device for the prototype system. A National Instruments Ni-DAQPad-6015 interface which included a 16-bit A/D converter (not shown) was connected to the pins JP4-1 and JP4-2 of the signal processing circuit/ The A/C converted the analog output voltage of the signal processing circuit to a digital signal representative of the intensity of the light registered by the photodiode of the signal processing circuit. The digital information sampled by the notebook computer was filtered using a $4^{th}$ order Butterworth polynomial low pass filter with a cutoff frequency of approximately 1 Hz.

The notebook computer was programmed with VIRTUAL INSTRUMENTS software, available from National Instruments Corporation of Austin, Tex. This software facilitated the generation and evaluation of calibration algorithms during testing of the prototype system.

The prototype system also included a tank, a housing assembly, and a mounting plate mounted on the tank as described above in relation to the system 10. The inner surface of the tank was non-reflective and opaque, to discourage ambient light from entering the waveguide slab, and to discourage any light exiting the waveguide slab from being reflected back into the waveguide slab.

Figure 19:
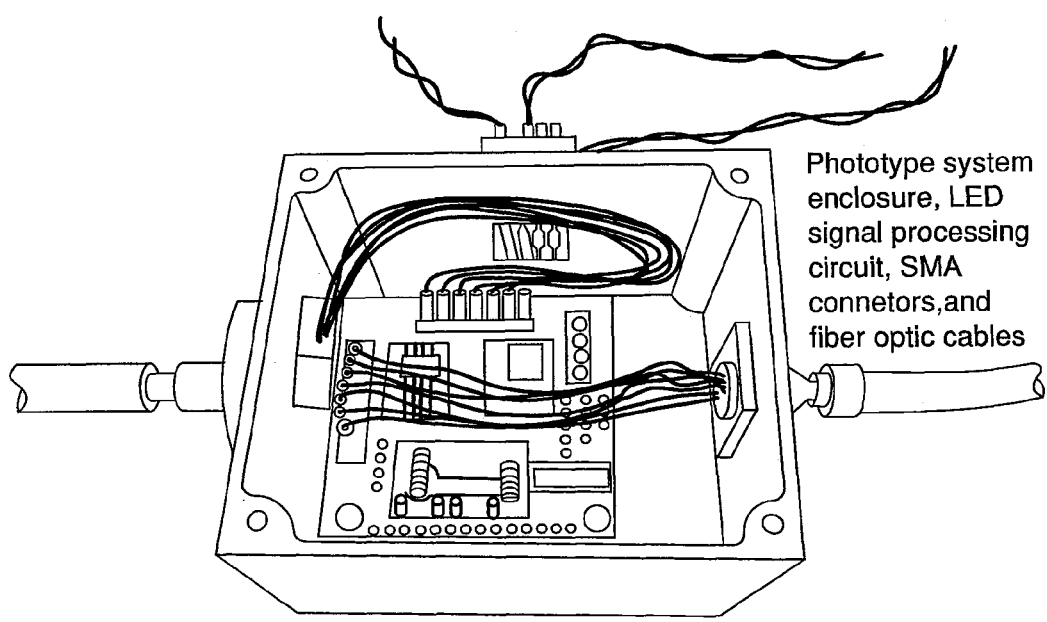
FIG. 19 depicts a light-emitting diode, a signal processor and an enclosure of a prototype electro-optic fluid quantity measurement system constructed by the Applicants.

FIG. 19 depicts an enclosure housing the LED and signal processing circuit of the prototype system. The approximate dimensions of the enclosure were 3.00 inches by 2.63 inches by 1.65 inches. It is believed that a production version of the LED, the signal processing circuit, and an accompanying computing device can be housed in an enclosure of comparable dimensions.

The performance of the prototype system was evaluated by recording the output voltage of the signal processing circuit in response to the level of Jet A aviation fuel in the tank. Testing commenced with the waveguide slab in a dry condition, and was subsequently conducted under full-to-empty and empty-to-full tank conditions.

Figure 22:
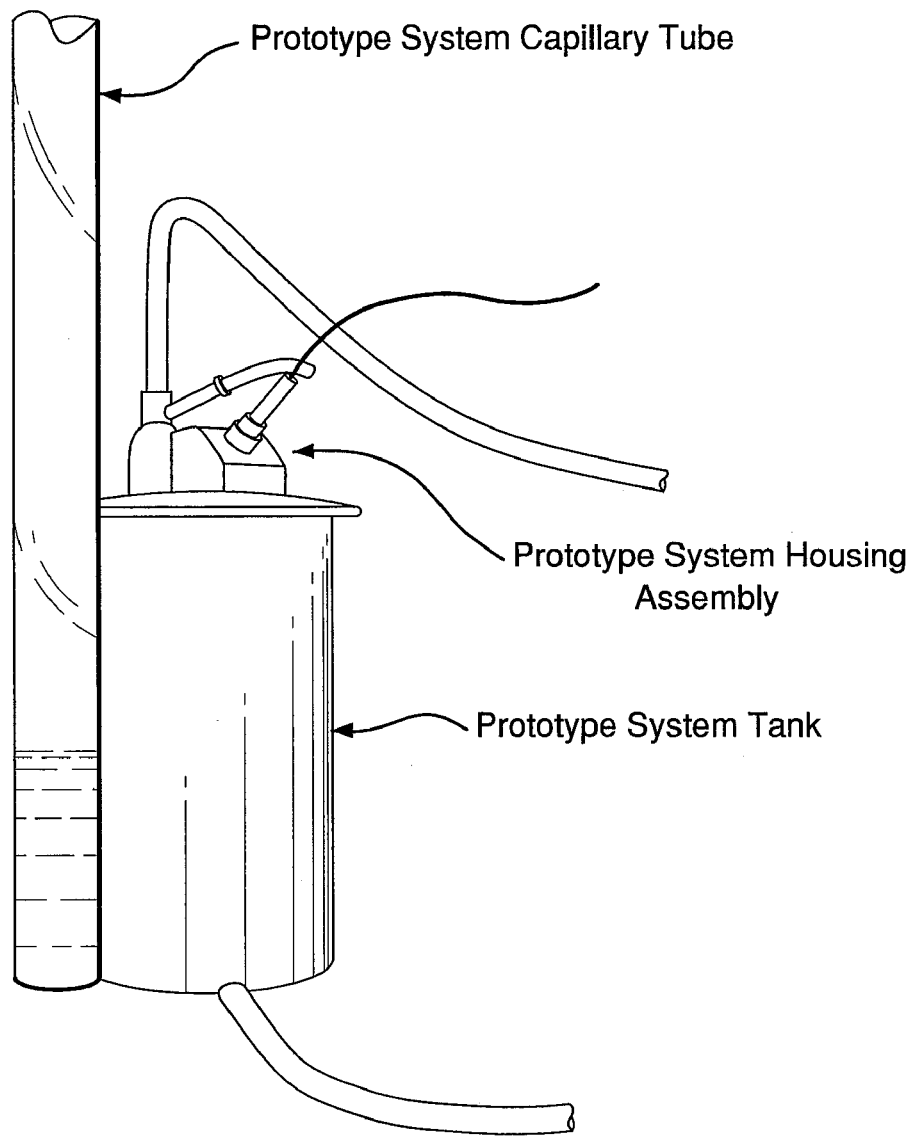
FIG. 22 depicts a tank, a housing assembly, and a capillary tube of the prototype system shown in FIGS. 19-21.

The level of the fuel in the tank was monitored by measuring the weight of the fuel in the tank using an electronic scale have a 25 pound capacity and 0.1% full-scale accuracy, and a capillary tube. The electronic scale provided a digital readout of weight in pounds to four significant figures. FIG. 22 shows the tank and capillary tube positioned on the electronic scale.

Figure 21:
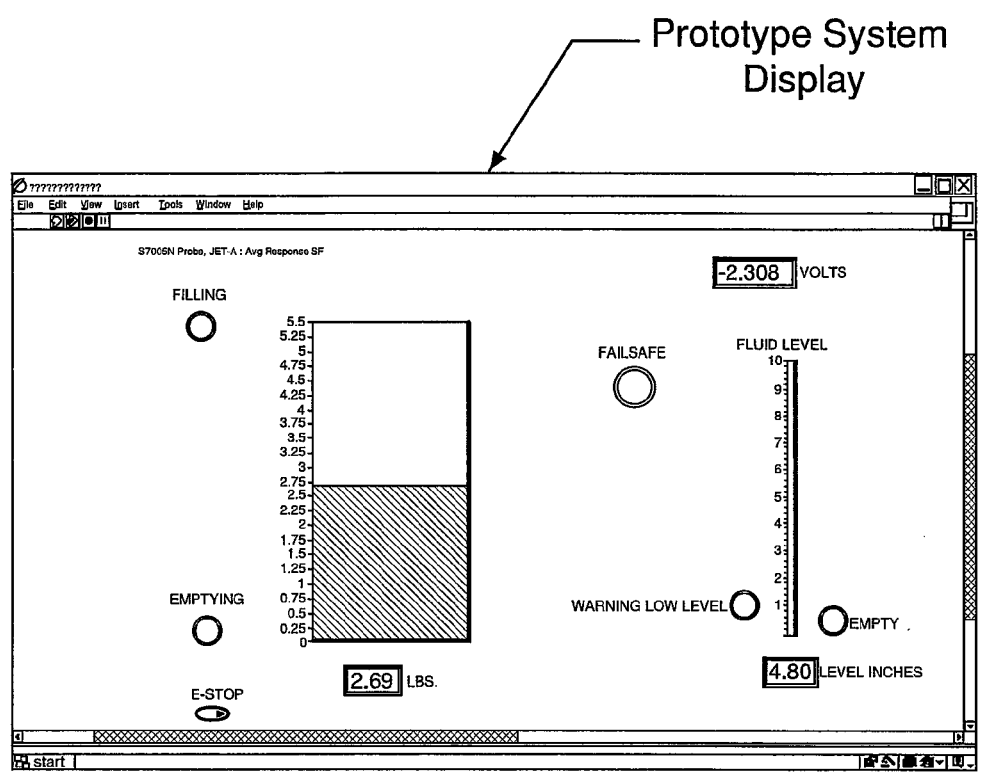
FIG. 21 depicts a display of the prototype system shown in FIGS. 19 and 20.

The tank and the attached mounting plate, housing assembly, and waveguide slab were placed on the electronic scale prior to introduction of the fuel, and the scale was zeroed. The response of the prototype system to the introduction of the fuel into the tank was documented by measuring and recording the output voltage of the signal processing circuit, i.e., the voltage at the input of the A/D converter. The notebook computer was programmed to display the weight of fuel in the tank as measured by the electronic scale and the corresponding output voltage of the signal processor as shown in FIG. 21.

The photodiode and preamp were mounted in a housing configured to accept an SMA connector attached to the associated fiber optic cable, as shown in FIG. 19. The LED was housed in an aluminum adapter to facilitate connection of the LED to a fiber optic cable using another SMT connector attached to the end of the associated fiber optic cable.

The voltages measured at the output of the signal processing circuit during repeated testing are presented tabular form in FIGS. 23A and 23B. Testing was conducted using Jet-A fuel at a temperature of approximately 24° C. to approximately 25° C. The temperature of the LED case was recorded for all testing, and varied between approximately 22.0° C. and approximately 26.2° C. As indicated by FIG. 24, which is based on the raw data presented in FIGS. 23A and 23B, the performance of the prototype system was monotonic and repeatable.

Data collection was spread out over a period of days, with no observable trend or drift. The standard deviation of measured output voltage of the signal processing circuit for fluid levels above 1 inch was in the range from approximately 0.006 volts to approximately 0.024 volts. Higher standard deviations for fluid levels of 1 inch and less were observed. The higher values for the standard deviation, however, are believed to be a result of the increased response of the circuit 158 at low fluid levels. Higher response at low fluid levels is characteristic of the prototype system, and results from the input light reaching the bottom of the waveguide slab at a low fluid level, and reflecting off of the mirror located at the bottom of the waveguide slab. This reflected light generates additional fluorescence as it travels up the waveguide slab, and the additional fluorescent radiation is collected and transmitted to the signal processing circuit by the associated optical fiber.

Figure 24:
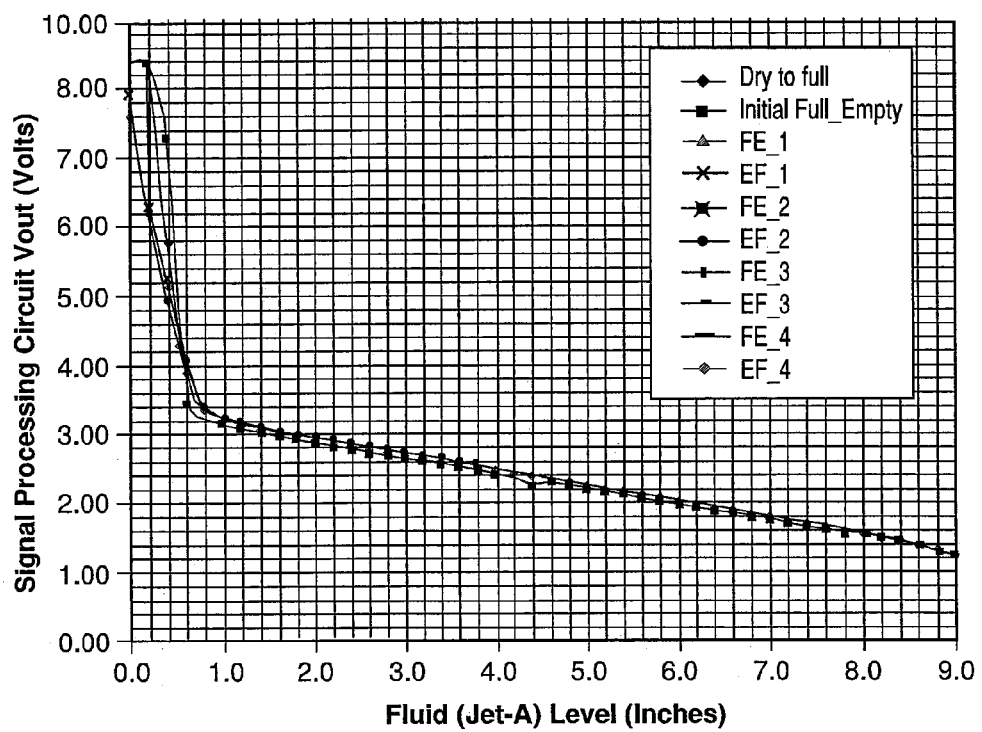
FIG. 24 is a graphical summary of the raw data presented in FIGS. 23A and 23B.

A calibration look-up table was developed using the information presented in FIGS. 23A, 23B, and 24. The look-up table was implemented in software in the notebook computer. The notebook computer displayed a direct readout of fluid level using the look-up table. An example of a logic statement for a fluid level of 1.0" programmed into the notebook computer, in pseudo code format, is as follows:

If the measured response voltage is greater than or equal to 3.295 volts but less than 3.494 volts, then the fluid level is 1.0"

The notebook computer with the analog input interface was configured to display a direct readout of the level of fuel in the tank in inches, using a calibration table of the average response for every 0.2-inch increment of a 9-inch usable range waveguide slab. The notebook computer configured in this manner is hereinafter referred to as "the demonstrator." The fuel level was displayed graphically on the notebook computer using National Instruments LABVIEW software, as shown in FIG. 21. The display on the right in FIG. 21 is the computed fuel level based on the analog voltage from the signal processing circuit, and logic implemented in the demonstrator. For reference only, the display on the left in FIG. 21 is the weight of fluid in the tank as recorded by the electronic scale upon which the test tank were positioned during testing.

After the look up table logic was implemented in the demonstrator, two additional tests were performed as follows. Beginning with an empty tank, the quantity of fuel in the tank was increased until the display on the demonstrator increased from approximately 0.00 to approximately 0.2 inches. The weight of the fuel in the tank as displayed on the electronic scale was recorded at this point. This process was repeated over the entire span of the prototype system, i.e., from a fuel level of approximately 0.2 to approximately 9.0 inches. A similar test was performed in a likewise manner by draining the tank from a full to an empty condition in increments of approximately 0.2 inch, and recording the weight of the fluid in the tank after each incremental decrease in fuel level, as displayed by the demonstrator. The results of this testing are depicted in FIGS. 25A and 25B.

Figure 26:
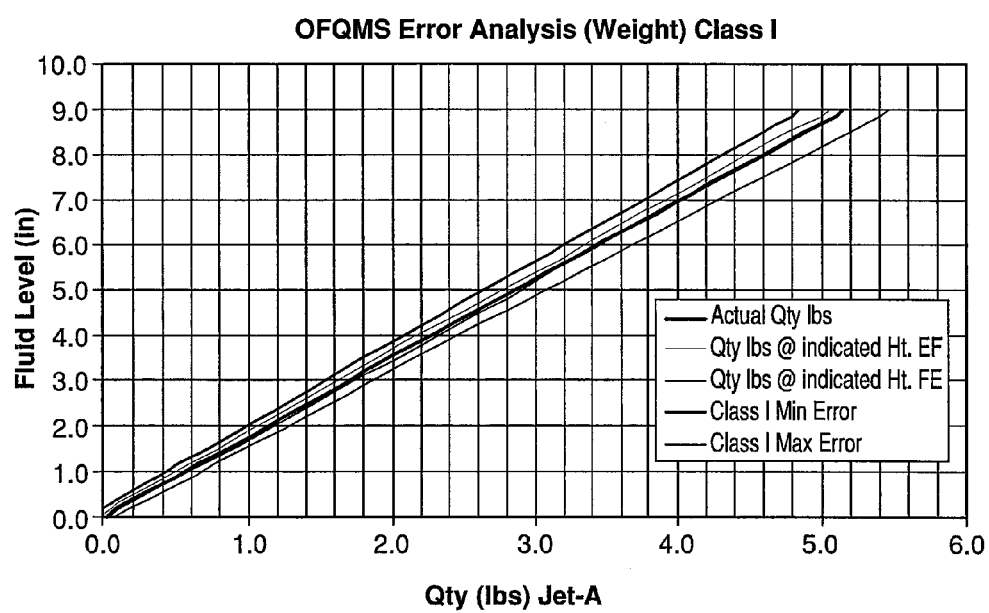
FIG. 26 is a graphical comparison between the data presented in FIGS. 25A and 25B, and the Joint Services Specification Guide 2009 (JSSG-2009) Class I accuracy requirements.

The data was then analyzed for compliance with the minimum and maximum Joint Services Specification Guide 2009 (JSSG-2009) Class I accuracy requirements of +4% Indication Error and +2% full-scale error. Overall, Class I accuracy requirements of +4% of indication and +2% full-scale were met, as shown graphically FIG. 26.

Figure 27:
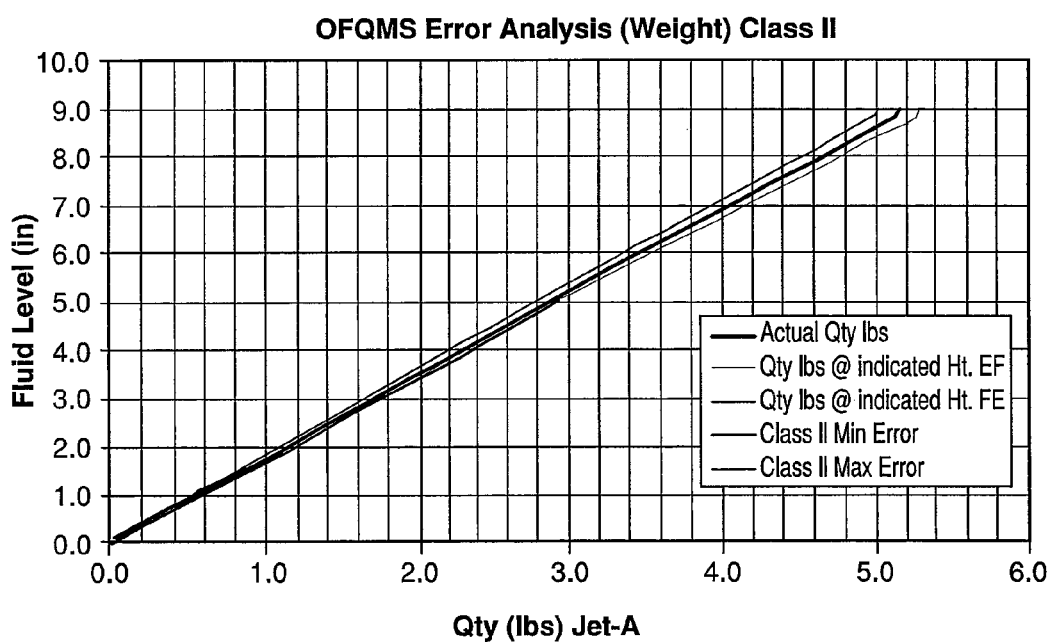
FIG. 27 is a graphical comparison between the data presented in FIGS. 25A and 25B, and the Joint Services Specification Guide 2009 (JSSG-2009) Class II accuracy requirements.

The data was also analyzed for compliance to the maximum and minimum Joint Services Specification Guide 2009 (JSSG-2009) Class II accuracy requirements of +2% Indication Error and +0.75% full-scale error. As shown in FIG. 27, compliance with these requirements was achieved, except at low fluid quantity.

Methods to improve the accuracy of the prototype system are presently being investigated and include: (a) the addition of an Optical Compensator to measure fuel temperature and adjust fuel quantity reported based on known density versus temperature characteristics for aviation fuel, (b) stabilizing the LED pump source over temperature using a sample of LED output in a feedback control configuration to maintain stable intensity; the use of a stabilized LED light source such as that disclosed in the above-referenced U.S. Patent Application titled "Systems and Methods for Generating Optical Energy Using a Light-Emitting Diode;" and (c) reducing the launch angle for LED pump light to a value slightly above the critical angle for the waveguide material in air to reduce the distance between reflections of light within the waveguide to improve resolution.

Applicants also evaluated the response of the prototype system in the presence of various types of fluids having different indexes of refraction. In particular, the response of the prototype system was evaluated when the waveguide slab was immersed in water, Jet A aviation fuel, SAE 10W-30 motor oil, and AEROSHELL Fluid 41 aviation hydraulic fluid.

The evaluation with each fluid was conducted by filling the tank of the prototype system with the fluid. The evaluation for each fluid was started with tank in an empty condition. The tank was filled increments of one-half inch, until the fluid level in the tank reached nine inches, and the response of the prototype system was documented after each incremental addition of fluid.

Figure 28:
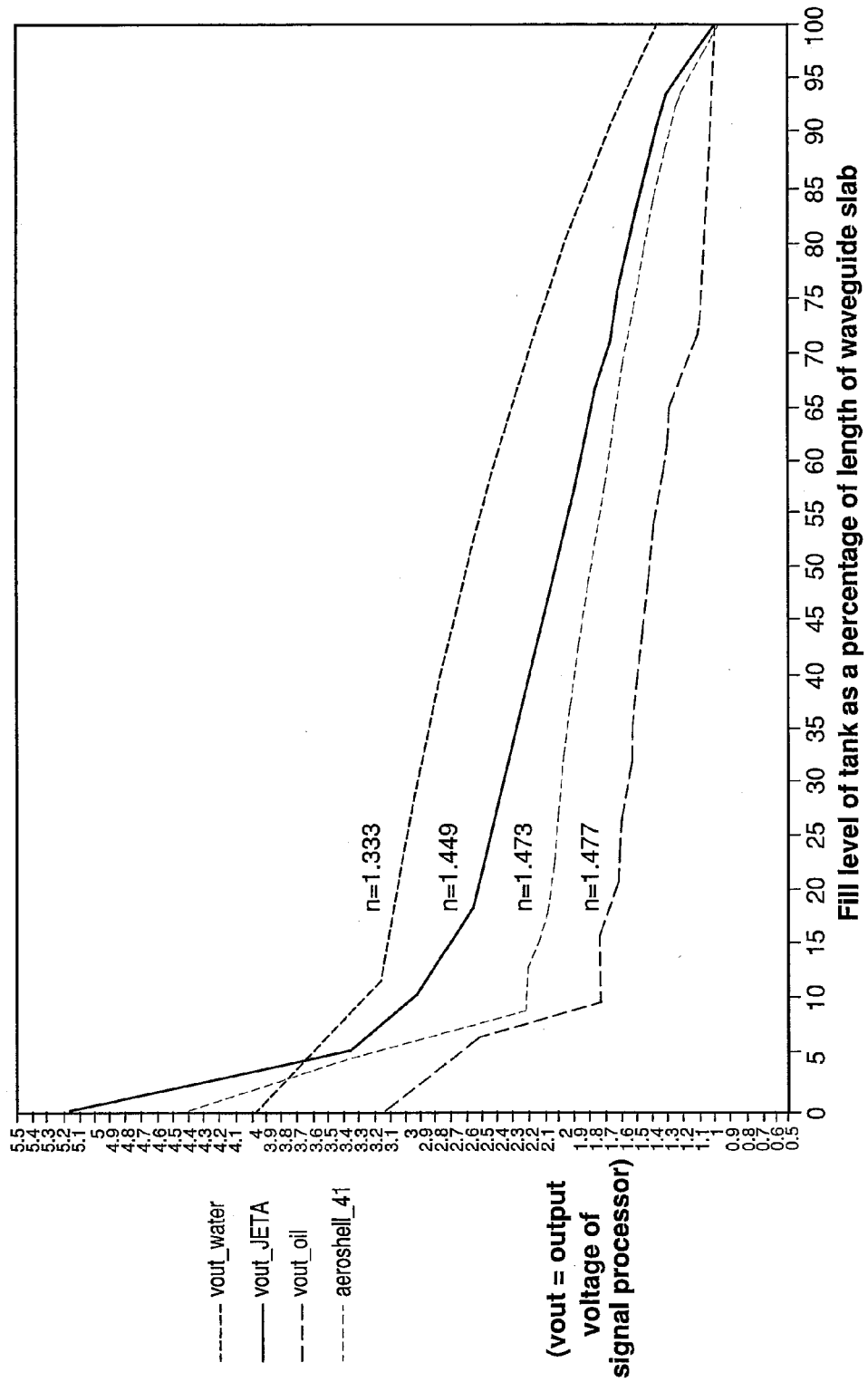
FIG. 28 is a graphical depiction of the response of the prototype system shown in FIGS. 19-22 to different types of fluids.

Applicants found that the response the prototype system varied with the type of fluid in the tank. More particularly, the response of the prototype system was found to be inversely proportional to the index of refraction of the fluid, as shown graphically in FIG. 28. For example, in FIG. 28 there is graphically shown for the tested fluids a range from 10% to 95% along the horizontal axis wherein response V(out) is inversely proportional to the fluid refractive index.

It is believed that the response of the prototype system to changes in the fluid index of refraction can be used to determine the density and temperature of a fluid of known identity. In particular, the dielectric constant of a fluid such as Jet A aviation fuel is related to the fluid's index of refraction (n) by following equation, referred to as Maxwell's Identify:

$$n = (\in)^{1/2}$$

Data relating the dielectric constant ($\in$) of fluids such as Jet A aviation fuel to the temperature and density of the fuel is available from sources such as the Handbook of Aviation Fuel Properties, CRC, Inc., Third Printing, May 1988.

Thus, the response of the prototype system to changes in the index of refraction of the fluid, in conjunction with the interrelationships between the index of refraction and the dielectric constant, density, and temperature of the fluid, can facilitate the use of the system to determine fluid density and temperature.

Figure 29A:
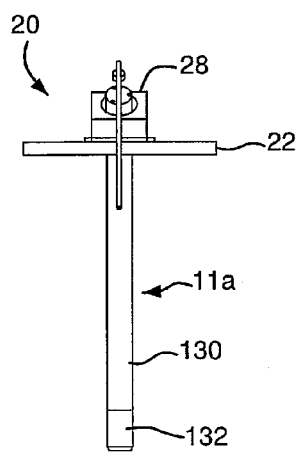
FIGS. 29A and 29B depict a concept of a variation of the prototype system shown in FIGS. 19-22, configured to determine the density and/or temperate of a fluid.
Figure 29B:
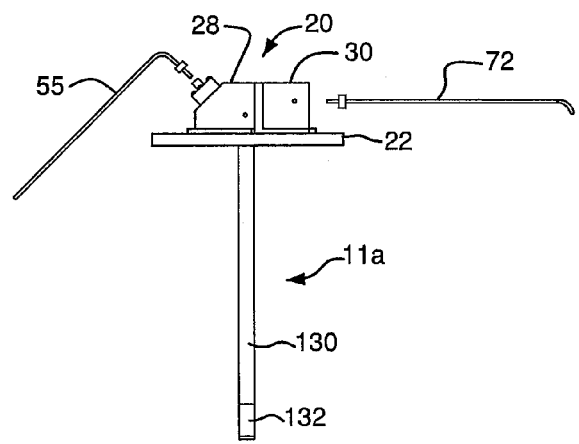

FIGS. 29A and 29B illustrate a concept of a waveguide slab 11a configured for measurement of fluid index of refraction. The waveguide slab can be used as part of a system that otherwise is substantially identical to the system 10.

A portion of the length of the sensing rod 46a of the waveguide slab 11a is covered with a low index of refraction coating 130 that promotes total or near total internal reflection of the light input to the sensing rod 46a. A portion 132 of the sensing rod 46a does not have the coating applied thereto. The portion 132 can make up a relatively small percentage of the overall length of the sensing rod 46a, and can be located at the bottom of the sensing rod 46a. The length and relative location of the portion 132 can be different than those depicted in FIGS. 29A and 29B in alternative embodiments.

The index of refraction of a fluid, in general, varies with the temperature of the fluid. The tank of the system can be fully or partially filled with a fluid of known identity, such as Jet A fuel, so that the portion 132 is fully immersed in the fluid. The response of the system can be documented as the temperature of the fluid is incrementally increased or decreased, and measured. The fluid index of refraction can be determined at each incremental temperature based on published data relating the index of refraction and temperature for the fluid.

Covering a portion the waveguide 46a with the low index of refraction coating 130 helps to ensure that the response of the system remains repeatable as the fluid level is the tank varies, as long as the portion 132 is immersed in the fluid.

The relationship between the response of the system and the fluid index of refraction can be programmed into the computing device of the system. The system can subsequently be used to determine the index of refraction of the fluid based on the response of the system. The density and temperature of the fluid can then be determined in the above-noted manner based on the index of refraction.

Because the response of the system 10 is affected by the type of fluid in tank 12, other variants of the system can be used to determine the type of fluid in the tank 12 when the fluid temperature is known. In particular, the response of the variant system to the presence of various fluid of known identity can be documented, as the temperature of each fluid is varied. The resulting relationships between the response of the system and the fluid temperature for each fluid type can be programmed into the computing device. The identity of the various fluids can subsequently be determined based on the response of the system, and the measured temperature of the fluid.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

Figures 30A, 30B:
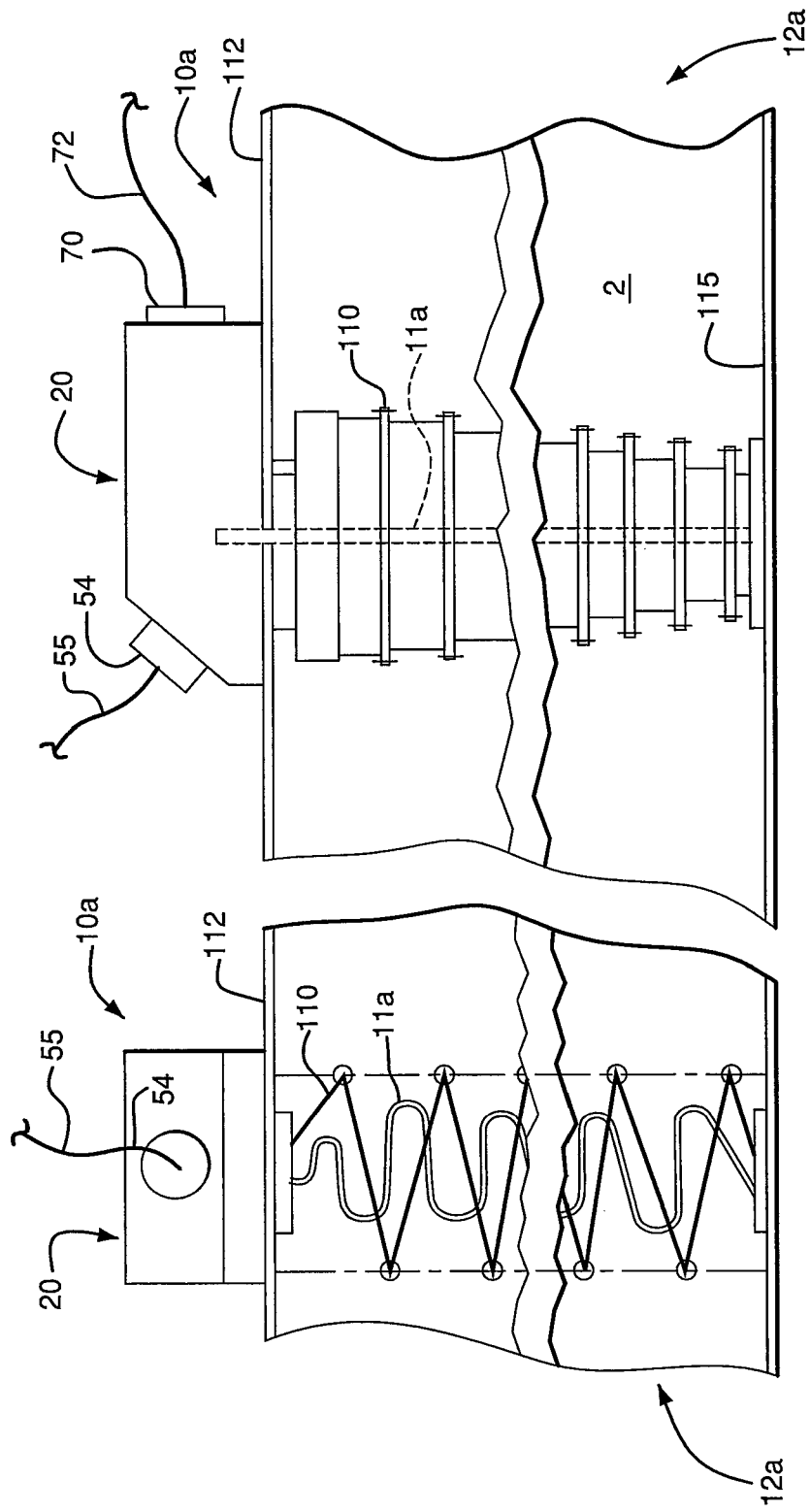
FIG. 30A is a side view of an alternative embodiment of the electro-optic fluid quantity measurement system shown in FIGS. 1-16.
FIG. 30B is a side view of the electro-optic fluid quantity measurement system depicted in FIG. 30A, rotated approximately ninety degrees from the perspective of FIG. 30A.

For example, FIGS. 30A and 30B depict an alternative electro-optic fluid quantity measurement system 10a. The system 10a is configured for use with a collapsible tank 12a. A top panel 112 of the tank 12b can move downwardly as the volume of fluid within the tank 12a decreases. The system 10a comprises a flexible waveguide slab 11a configured in a serpentine pattern, as shown in FIG. 30A. The waveguide slab 11a can be formed, for example, from an inorganic polymeric material such as fluorinated acrylate.

The waveguide slab 11b is mounted within a supporting structure 110 secured the top panel 112 and a bottom panel 115 of the tank 12a. The supporting structure 110 is rigid, and can contract and expand in an accordion-like manner as the top panel 112 moves downwardly and upwardly in response to changes in the volume of fluid within the tank 12a. The system 10a is otherwise substantially identical to the above-described system 10. Components of the system 10a that are substantially identical to those of the system 10 are denoted by common reference numerals in the figures.

The serpentine configuration of the waveguide slab 11a, in conjunction with the supporting structure 112, allow the overall height, i.e., vertical dimension, of the waveguide slab 11a to vary as the top panel 112 moves upwardly and downwardly. The serpentine configuration of the waveguide slab 11a and the supporting structure 110 also permit the waveguide slab 11a to undergo variations in height without kinking, i.e., without impending the ability of the waveguide slab 11a to transmit light.

Figure 31:
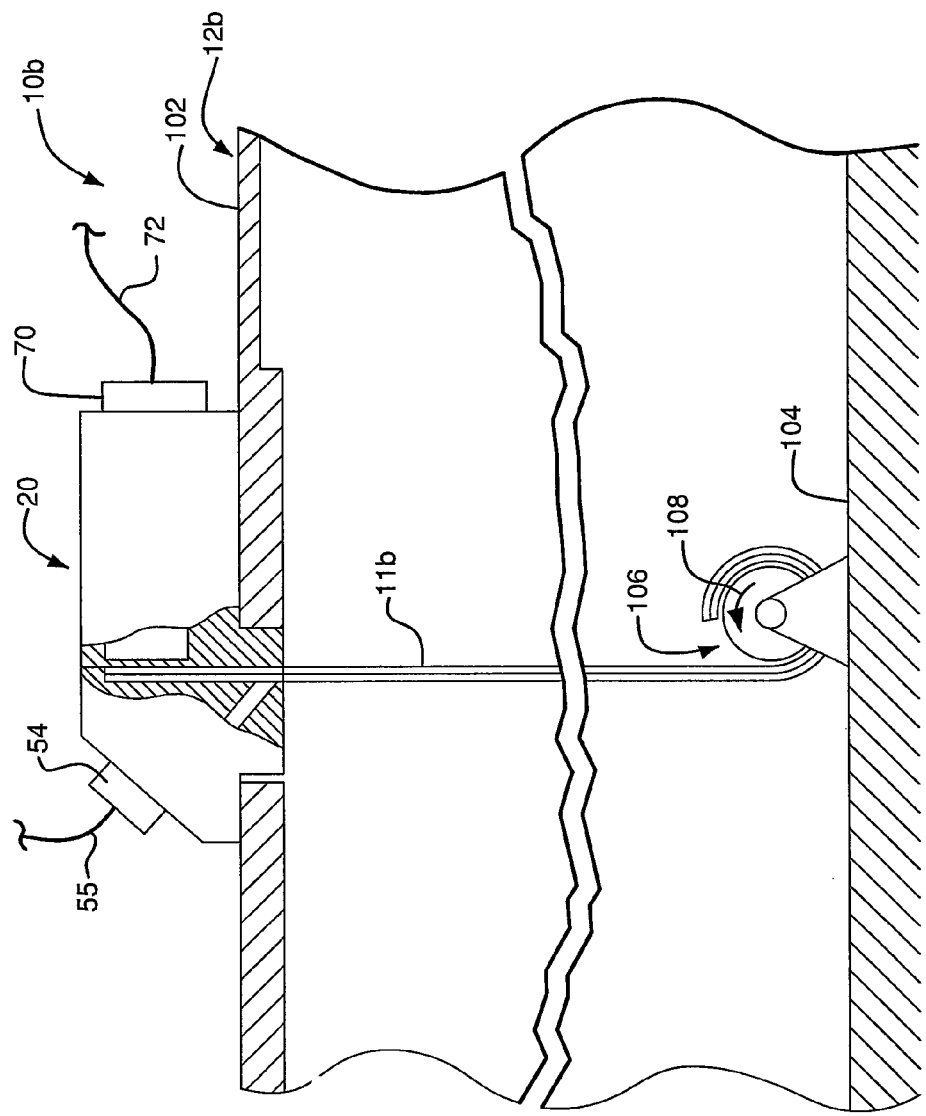
FIG. 31 is a side view of another alternative embodiment of the electro-optic fluid quantity measurement system shown in FIGS. 1-16.

FIG. 31 depicts another alternative electro-optic fluid quantity measurement system 10b. The system 10b is adapted for use with a collapsible tank 12b. A top panel 102 of the tank 12b can move downwardly as the volume of fluid within the tank 12a decreases. The system 10b comprises a flexible waveguide slab 11b. The waveguide slab 11b can be formed, for example, from an inorganic polymeric material such as fluorinated acrylate.

The system 10b also comprises a negator spring 106 mounted on a base 104 of the tank 12b, and secured to a lower end of the waveguide slab 11b. The system 10b is otherwise substantially identical to the above-described system 10. Components of the system 10b that are substantially identical to those of the system 10 are denoted by common reference numerals in the figures.

The negator spring 106 is biased in a counterclockwise direction, as denoted by the arrow 108 in FIG. 31. The bias of the negator spring causes the waveguide slab 11b to remain in tension as the top panel 102 moves downward in response to changes in the volume of fluid within the tank 12b. Moreover, the waveguide slab 11b wraps around the negator spring 106 as the top panel 102 moves downward, thereby allowing the height of the waveguide slab 11b to decrease without the waveguide slab 11b becoming kinked.

The specific spectral ranges of light specified herein are presented for exemplary purposes only. Alternative embodiments can utilize light (electromagnetic radiation) within other spectral ranges, including ranges beyond the range of visible light. Also, the system 10 comprises separate fiber optic cables 55, 72 to transmit optical signals between the LED 53 and the collimating lens assembly 54, and between the output connector 60 and the PMT 76. These signals can, in the alternative, be transmitted using a single duplex cable housing both the optical fiber 55a and the optical fiber 72a, or using optical conductors other than cables. Moreover, alternative embodiments of the system 10 can comprise more than one of the optical fibers 55a and more than one of the optical fibers 72a.

The electrical components of the system 10 are located outside of and away from the tank 12. Hence, the potential for the electrical components of the system 10 to ignite a flammable mixture within the tank 12 is virtually non-existent.

Furthermore, the optical signals carried by the optical fibers 55a, 72a are immune to the effects of electro-magnetic interference. The system 10 also has lower power requirements that conventional capacitance-type fluid-level transmitters of similar capability, and does not require the relatively complex calibration process that such transmitters must routinely undergo. Furthermore, the system 10 has no moving parts, thus providing potential advantages relating the reliability and maintainability. Moreover, the system 10 can operate on a substantially passive basis once activated.

What is claimed is:

1. A system for use in measuring a fluid characteristic, comprising:
    a source of optical energy;
    an optical waveguide slab in optical communication with the source of optical energy, the optical waveguide slab being at least partially filled with a material that fluoresces when illuminated by optical energy produced by the source of optical energy, and wherein the optical waveguide slab has an elongated body with first and second portions positioned for fluid contact in use, and wherein said first portion includes a reflective cover, and wherein said first portion is positioned closer to a light source entry point in said optical waveguide slab than said second portion, and said second portion provides for light transmission external to the optical waveguide slab into a fluid in contact with said second portion in use, and wherein said first portion extends longer than said second portion;
    a detector of optical energy in optical communication with the optical waveguide slab, wherein the detector of optical energy generates an output in response to the fluorescence of the fluorescent material; and
    a computing device communicatively coupled to the detector of optical energy, wherein the computing device stores input data, which input data is derived from an output of said optical waveguide slab, and wherein said computing device is preprogrammed with a plurality of relationships established relative to respective responses of the system to the presence of various types of fluids of known identity, with each fluid type also having been subjected to variations in temperature in the establishment of said plurality of relationships for the various types of fluid of known identity.

2. The system of claim 1, wherein said detector comprises a photodiode unit in optical communication with the optical waveguide slab, the photodiode unit comprising a photodiode and an amplifier communicatively coupled to the photodiode, the photodiode unit generating an electrical output in response to the fluorescence of the fluorescent material.

3. The system of claim 1, wherein the detector of optical energy is a photodiode.

4. The system of claim 3, further comprising an electrical circuit comprising the photodiode, wherein the electrical circuit generates an output voltage proportionate to the response of the photodiode to the fluorescence of the fluorescent material.

5. The system of claim 1, wherein the detector of optical energy is a photo multiplier tube.

6. The system of claim 5, further comprising a signal processor communicatively coupled to the photo multiplier tube, wherein the signal processor generates an output voltage proportionate to the response of the photo multiplier tube to the fluorescence of the fluorescent material.

7. The system of claim 1, wherein the source of optical energy is a light-emitting diode.

8. The system of claim 1, wherein the reflective cover is a low index of refraction coating provided along only a portion of the length of the optical waveguide slab.

9. The system of claim 1, further comprising a waveguide housing from which said optical waveguide slab extends and a collimating lens assembly mounted in the waveguide housing and in optical communication with both the source of optical energy and the optical waveguide slab.

10. The system of claim 9, wherein a bonding material is disposed in the interface between the collimating lens assembly and the optical waveguide slab.

11. The system of claim 1, wherein the optical waveguide slab is formed from approximately five to approximately ten-percent samarium-doped optical filter glass; or poly methyl methacrylate doped with a fluorescent dye.

12. The system of claim 1, further comprising a housing assembly comprising a waveguide housing and a connector housing, and wherein said waveguide slab is mounted within said waveguide housing to have a detector side surface coplanar with a detector side surface of said waveguide housing, which surface contacts said connector housing.

13. The system of claim 1, said detector comprises a fiber optic cable in optical communication with said waveguide slab and an output connector, wherein an end of the fiber optic cable is mounted in the output connector and the output connector is mounted in the connector housing such that said output connector is flush mounted on an exposed surface of said optical waveguide slab.

14. The system of claim 13, wherein said output connector comprises a main body and a gasket disposed between the main body and the waveguide slab in conjunction with the flush mounting.

15. A method of using the system of claim 1, comprising:
immersing said optical waveguide slab in the fluids of known identity;
illuminating the optical waveguide slab with optical energy; and
generating said input data.

16. The method of claim 15, further comprising measuring the optical energy associated with the fluorescence of the material within the optical waveguide slab using a photodiode unit as the detector of optical energy.

17. The method of claim 15, wherein said illuminating of the optical waveguide slab with optical energy comprises directing optical energy from a light emitting diode at the optical waveguide slab.

18. The method of claim 15, wherein the detector of optical energy is a photodiode or a photo multiplier tube.

19. The method of claim 15, further comprising detecting the output of the optical waveguide slab which has a first portion that promotes total or near total internal reflection and a second portion that allows light transmission to a fluid in-contact with the waveguide slab in use.

20. The method of claim 15 wherein the different types of fluid include aviation fuel.

21. The system of claim 1 wherein the different types of fluid include aviation fuel.

22. A system for use in measuring a fluid characteristic, comprising:
a source of optical energy;
an optical waveguide slab in optical communication with the source of optical energy, the optical waveguide slab comprising a material that fluoresces when illuminated by optical energy produced by the source of optical energy and wherein said optical waveguide slab has an elongated body with first and second portions positioned for fluid contact in use;
a detector of optical energy in optical communication with the optical waveguide slab, wherein the detector of optical energy generates an output in response to the fluorescence of the fluorescent material; and
wherein the first portion of the optical waveguide slab has a covering that promotes total or near total internal reflection and the second portion is free of the covering; and
a computing device communicatively coupled to the detector of optical energy,
and wherein the computing device is preprogrammed with a plurality of relationships established relative to respective responses of the system to the presence of various types of fluids of known identity, with each fluid type also having been subjected to variations in temperature in the establishment of said plurality of relationships for the various types of fluid of known identity.

23. The system of claim 22, wherein said first portion is positioned closer to an initial light entry point of said optical waveguide slab than said second portion and said second portion provides for light transmission external to the optical waveguide slab into a fluid in contact with said second portion in use.

24. The system of claim 23, wherein said first portion includes the covering which is a reflective covering directly applied to the optical waveguide slab.

25. The system of claim 24, wherein said reflective cover includes a low index of refraction coating.

26. The system of claim 23, wherein said first portion extends longer than said second portion.

27. The system of claim 22, wherein said second portion borders said first portion and extends for a lesser length along said optical waveguide slab than said first portion.

28. The system of claim 22, wherein said optical waveguide slab is supported in a tank configured for fluid retention.

29. The system of claim 22 wherein the different types of fluid include aviation fuel.

30. A system for use in measuring a fluid characteristic of a fluid, comprising:
a source of optical energy;
an optical waveguide assembly in optical communication with the source of optical energy, the optical waveguide assembly comprising a material that fluoresces when illuminated by optical energy produced by the source of optical energy, said optical waveguide assembly including a waveguide slab with a portion that is designed for fluid contact and which promotes total or near total internal reflection, wherein said optical waveguide slab has a first portion representing the said portion that is designed for fluid contact and which promotes total or near total internal reflection, and a second portion that is in fluid contact in use and which provides for light transmission external to the optical waveguide slab into the fluid;
a detector of optical energy in optical communication with the optical waveguide assembly, wherein the detector of optical energy generates an output in response to the fluorescence of the fluorescent material; and
a computing device communicatively coupled to the detector of optical energy, wherein the computing device is preprogrammed with a plurality of relationships established relative to respective responses of the system to the presence of various types of fluids of known identity, with each fluid type also having been subjected to variations in temperature in the establishment of said plurality of relationships for the various types of fluid of known identity.

31. The system of claim 30, wherein said first portion includes a reflective cover.

32. The system of claim 31, wherein said reflective cover includes a low index of refraction coating.

33. The system of claim 30, further comprising a housing which supports both the optical waveguide slab and the detector, and wherein said first portion extends out away from said housing.

34. The system of claim 33, wherein said first portion borders said housing and said second portion borders said first portion and extends away from said first portion along said optical waveguide slab.

35. The system of claim 30 wherein the different types of fluid include aviation fuel.

* * * * *